(12) United States Patent
Pierce

(10) Patent No.: US 11,341,568 B1
(45) Date of Patent: May 24, 2022

(54) SOFTWARE ENABLING AUTOMATED UPSELL TEXT MESSAGING FOR RETAILERS WITHIN SHIPPING NOTIFICATION TEXT MESSAGES

(71) Applicant: MessageBuy, Inc., Cary, NC (US)

(72) Inventor: Darren Pierce, Raleigh, NC (US)

(73) Assignee: MessageBuy, Inc., Cary, NC (US)

( * ) Notice: Subject to any disclaimer, the term of this patent is extended or adjusted under 35 U.S.C. 154(b) by 255 days.

(21) Appl. No.: 16/872,334

(22) Filed: May 11, 2020

Related U.S. Application Data

(60) Provisional application No. 62/846,518, filed on May 10, 2019.

(51) Int. Cl.
| | |
|---|---|
| *G06Q 30/06* | (2012.01) |
| *G06F 9/54* | (2006.01) |
| *H04L 67/133* | (2022.01) |
| *H04L 51/046* | (2022.01) |

(52) U.S. Cl.
CPC ......... *G06Q 30/0643* (2013.01); *G06F 9/547* (2013.01); *H04L 51/046* (2013.01); *H04L 67/40* (2013.01)

(58) Field of Classification Search
CPC ....... H04L 51/046; H04L 67/40; G06F 9/547; G06Q 30/0631; G06Q 30/0633; G06Q 30/0641; G06Q 30/0643
See application file for complete search history.

(56) References Cited

U.S. PATENT DOCUMENTS

| | | | | |
|---|---|---|---|---|
| 2008/0285735 | A1* | 11/2008 | Ravishankar | H04L 51/04 379/207.02 |
| 2010/0017280 | A1* | 1/2010 | Davis | G06Q 30/02 455/406 |
| 2012/0095856 | A1* | 4/2012 | Sanjeev | G06Q 30/02 705/17 |
| 2015/0332370 | A1* | 11/2015 | Kumar | G06Q 30/0625 705/26.62 |
| 2015/0363831 | A1* | 12/2015 | Friborg, Jr. | G06Q 30/0267 705/14.55 |
| 2017/0200209 | A1* | 7/2017 | Cheng | G06Q 30/0601 |
| 2017/0270574 | A1* | 9/2017 | Hessurg | G06Q 30/0601 |
| 2018/0375815 | A1* | 12/2018 | Dinardo, Sr. | H04L 12/1859 |

* cited by examiner

*Primary Examiner* — Jeong S Park
(74) *Attorney, Agent, or Firm* — Tillman Wright, PLLC; Neal B. Wolgin; David R. Higgins

(57) ABSTRACT

A method for enabling automated upsell text messaging within shipping notification text messages using a software application includes: accepting a purchase transaction from a consumer via an electronic device; retrieving a mobile telephone number for the consumer in connection with the purchase transaction; sending a first text message via the software application to the consumer at the mobile telephone number to confirm shipping information; sending a second text message via the software application to the consumer to present an offer to the consumer for an additional item; and if the consumer replies to the offer in the affirmative, adding the additional item to the purchase transaction.

5 Claims, 37 Drawing Sheets

High Level Architecture Overview

Process Flow

- Consumer makes a purchase from an online retailer that is a MessageBuy client
- In the checkout process the consumer opts-in to receive shipping notifications and other messages via text message. Their payment method is tokened by the payment gateway used by the retailer, so that additional charges can be placed on the same card (without the consumer having to re-enter it every time).
- MessageBuy software integrates with retailer's ecommerce platform, and payment gateway, and captures consumers mobile phone number in order to send shipping details in text message format.
- MessageBuy software triggers a text message to consumer, letting them know the order has been received and they will hear from the retailer shortly with a tracking number. They are also opted in to receive messages from retailer, and can test STOP at any time to opt out.
- Then another message is sent (time delay is configurable by retailer) appearing to be a real person, and the person is asking the consumer if they want to add x item to their order before it ships at a discount (configurable by retailer).
- If consumer texts back yes or buy, that additional charge is placed on the original payment method using the token, and it is added in with the shipment.
- Online retailer is made aware of additional purchase by consumer through MessageBuy software so they can consolidate the orders for the consumer
- New automated shipping message is sent with the Shipping notification is sent from MessageBuy with the assistance of a third-party partner that offers designated numbers that will individually be assigned to each MessageBuy client. This will allow each consumer to have an ongoing text message exchange with the retailer (i.e. for future text message purchases).
- The timing of when the shipping notification is sent out after purchase has been made is designated by the online retailer within the MessageBuy software
- If consumer doesn't want upsell offer they can communicate that via text or decide to not respond at all. Online retailer will designate a set time period in MessageBuy software for how long the upsell offer should be in play
- Once the order is finalized either with the upsell or without based on designated time period the MessageBuy software will send the final shipping details via text in order to summarize the total transaction.

*FIG. 3*

Messaging Platform utilizes Messaging Service API to send text message confirming order.

Messaging Platform utilizes Messaging Service API to send text message querying whether user would like to add a suggested item to order.

```
// adjust customer opt in status
if ($mbData) {
    $consumer->opt_in = $mbData->optin;
}
```

FIG. 23

```
public function bestUpsellProduct()
    {
        $defaultProduct = $this->store->defaultUpsellProduct();

if (!$defaultProduct) {
            throw new \Exception('No default upsell product is configured.');
        }

$containsDefaultProduct = false;
        $optimalProduct = null;
        foreach ($this->products as $product) {
            if ($product['identifier'] == $defaultProduct['identifier']) {
                $containsDefaultProduct = true;
            }
            $upsell = UpsellProduct::where([
                'store_id' => $this->store->id,
                'cart_product_id' => $product['identifier'],
                'enabled' => true
            ])->first();
            if (!$upsell) {
                continue;
            }
            $upsellProduct = $upsell->product();
```

FIG. 24A

```
if (!$upsellProduct) {
        \Log::warning('Error: upsell product with ID ' .
            $upsell->upsell_product_id . ' does not exist for store id ' .
            $this->id . ' (' . $this->url . ')');
        continue;
    }

// make sure that the order doesn't already contain this product.
    foreach ($this->products as $key => $product) {
        if ($product['identifier'] == $upsellProduct['identifier']) {
            continue 2;
        }
    } if (!$optimalProduct || $optimalProduct['price'] < $upsellProduct['price']) {
        $optimalProduct = $upsellProduct;
    }
} if ($optimalProduct) {
    return $optimalProduct;
} if (!$containsDefaultProduct || ($containsDefaultProduct && $this->upsell_status ==
'accepted')) {
    return $defaultProduct;
} return null;
}
```

FIG. 24B

```
public function sendUpsellMessage(Order $order)
    {
        $message = $this->createMessageFromTemplate('upsell', $order);

// probably best to delay based off the time of the order
itself.
        $delay = $order->created_at;

$delay->add($order->store->upsell_delay . ' seconds');
        $message->send($delay);

return $message;
    }
```

FIG. 25

```
$consumerMessage = $event->consumerMessage;

if ($consumerMessage->status !== 'received') {
        return;
    } if (preg_match('/^\s*STOP\s*$/i', $consumerMessage->text)) {
        return event(new ConsumerOptOutRequest($consumerMessage->consumer));
    } if (preg_match('/^\s*UNSTOP\s*$/i', $consumerMessage->text)) {
        return event(new ConsumerOptInRequest($consumerMessage->consumer));
    } if (preg_match('/^\s*HELP\s*$/i', $consumerMessage->text)) {
        return event(new ConsumerHelpRequest($consumerMessage->consumer));
    } if (preg_match('/^\s*YES\s*$/i', $consumerMessage->text)) {
        return event(new ConsumerConfirmUpsellRequest($consumerMessage));
    } if (preg_match('/^\s*NO\s*$/i', $consumerMessage->text) &&
        $consumerMessage->closestOrder) {
        return event(new ConsumerRejectUpsellRequest($consumerMessage));
    }
```

FIG. 26

```
// accept and send confirmation
        try {
            \Log::info('Asking to complete upsell for order id ' . $order->id .
                ' (' . $order->external_id . ')');
            $newOrder = $order->store->completeUpsell($order);

} catch (\Exception $e) {
            if ($e->getCode() == Order::PAYMENT_ERROR) {
                \Log::warning('Problem with payment method for consumer ' . $consumer->id ', order id ' . $order->id .
                    ' (' . $order->external_id . '): ' .
                    $e->getMessage());
                $consumer->sendPaymentErrorMessage($order);
            } else {
                // something went wrong
                \Log::error('Unhandled error completing upsell for order id ' . $order->id ' (' . $order->external_id . '): ' .
                    $e->getMessage());
                $consumer->sendErrorMessage($order);
            }
            return;
        }
```

FIG. 27

```
$order = $consumerMessage->order;

// check if order has upsell sent but not complete.
    if ($order->upsell_status == 'offered') {
        $order->rejectUpsell();
        $consumer->sendMessageFromTemplate('upsell_decline', $order);
    } else {
        \Log::warning('Consumer id ' . $consumer->id . ' tried to reject upsell offer for
          order id ' .
            $order->id . ' (' . $order->external_id .
            '), but order upsell status is ' . $order->upsell_status);
        // no offer made or offer in another state.  error.
        if ($order->upsell_status == 'rejected') {
            // let them know we've already received their request.
            $consumer->sendMessageFromTemplate('upsell_decline_error', $order);
        } elseif ($order->upsell_status == 'accepted') {
            $consumer->sendMessageFromTemplate('upsell_success_error', $order);
        } else {
            $consumer->sendMessageFromTemplate('error', $order);
        }
    }
```

*FIG. 28*

```
if (!$this->store->url || !$this->_serverInfo) {
        throw new \Exception('Missing required external store information');
    } if (!$this->checkOrderPaymentToken($order)) {
        throw new \Exception('Payment token information is missing', Order::NO_PAYMENT_TOKEN);
    } try {
        $response = $this->magentoApiClient($this)
            ->post('order/' . $order->external_id . '/upsell?sku=' . $order->store-
>selected_upsell_sku);
    } catch (\GuzzleHttp\Exception\ConnectException $e) {
        \Log::error('Store URL ' . $this->store->url . ' for store id ' . $this->store->id . ' 
appears down.');
        throw new \Exception('Order problem for order id ' . $order->id . '; Store URL ' . 
            $this->store->url . ' for store id ' . $this->store->id . 
            ' appears down', Order::GENERAL_ERROR);
    }
```

FIG. 29

SOFTWARE ENABLING AUTOMATED UPSELL TEXT MESSAGING FOR RETAILERS WITHIN SHIPPING NOTIFICATION TEXT MESSAGES

CROSS-REFERENCE TO RELATED APPLICATION

The present application is a U.S. nonprovisional patent application of, and claims priority under 35 U.S.C. § 119(e) to, U.S. provisional patent application 62/846,518, filed May 10, 2019, which provisional patent application is incorporated by reference herein.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE PRESENT INVENTION

Field of the Present Invention

The present invention relates generally to shipping notifications for commercial transactions, and, in particular, to shipping notifications sent via text message services for commercial transactions.

Background

Shipping notifications for electronic commerce often come in the form of electronic messages or text messaging on mobile electronic devices. Such notifications include information pertaining to the commercial transaction and, in particular, include information pertaining to shipping information for a commercial product to be provided to a consumer. In many instances, a consumer will enter into a commercial transaction using an online store, and a shipping notification is provided to clarify purchase and shipping information that is pertinent to the transaction.

FIG. 5 illustrates an exemplary system including various platforms and services working together to enable electronic commerce. This system includes an E-Commerce Platform (such as WooCommerce, Magenta, or Shopify), a Payment Gateway (such as Autorize.net), and a Messaging Service (such as Bandwidth.com) which is configured to send SMS or MMS messages. Generally, a customer uses a web browser or app to browse one or more interfaces of a page, site, or app of the E-Commerce Platform, and acts to purchase one or more items or services (e.g. by adding them to a shopping cart and checking out). The customer is prompted to input payment information such as a credit card number via an interface of the E-Commerce Platform, and payment information is communicated from the E-Commerce Platform to the Payment Gateway for authorization, as illustrated in FIG. 6. (Alternatively, a user may be prompted to input payment information via an interface associated with the Payment Gateway, e.g. an interface that is embedded or that a web browser is directed to before being redirected to a page of the E-Commerce Platform.)

The Payment Gateway authorizes the card, stores payment information (e.g. credit card information), and returns a payment token to the E-Commerce Platform, as illustrated in FIG. 7. The payment token can be used to subsequently capture the amount for the order by communicating the payment token together with a payment amount to the Payment Gateway, as illustrated in FIG. 8. This generally happens upon order confirmation or shortly thereafter (e.g. as part of an hourly or daily capture process for all orders), and the E-Commerce Platform generally does not save the payment token once payment is captured. The E-Commerce Platform then utilizes an application programming interface (API) of the Messaging Service to send a text message to the customer confirming the order, as illustrated in FIG. 9.

Often, once a commercial transaction has been completed and a product has been shipped, a consumer will wish to engage the same party for a follow-up transaction or a new purchase. This usually necessitates the consumer visiting the same online store to find the product desired and then enter relevant information anew (e.g., shipping information, credit card information, etc.). Such additional steps can be time-consuming. Furthermore, electronic communications arising from such commercial transactions are non-dynamic and generally lack a personal touch that fosters a level of comfort with the consumer.

Accordingly, a need exists for an improved methodology for consumers to engage online retailers directly to complete online commercial transactions. Furthermore, a need exists for an improved methodology for consumers to initiate such commercial transactions using an electronic device. These, and other needs, are addressed by one or more aspects of the present invention.

SUMMARY OF THE PRESENT INVENTION

Some exemplary embodiments of the present invention may overcome one or more of the above disadvantages and other disadvantages not described above, but the present invention is not required to overcome any particular disadvantage described above, and some exemplary embodiments of the present invention may not overcome any of the disadvantages described above.

Broadly defined, the present invention according to one aspect includes a method for enabling automated upsell text messaging within shipping notification text messages using a software application. The method includes: accepting a purchase transaction from a consumer via an electronic device; retrieving a mobile telephone number for the consumer in connection with the purchase transaction; sending a first text message via the software application to the consumer at the mobile telephone number to confirm shipping information; sending a second text message via the software application to the consumer to present an offer to the consumer for an additional item; and if the consumer replies to the offer in the affirmative, adding the additional item to the purchase transaction.

In a feature of this aspect, the method further includes using a retailer payment gateway system for tokening a payment method used by the consumer.

In another feature of this aspect, the method further includes offering the consumer an opportunity to opt in to receiving shipping notifications via text message.

In another feature of this aspect, the method further includes offering the consumer an opportunity to opt out of receiving further notifications via text message after the first text message has been sent.

In another feature of this aspect, the first and/or second text messages are received at a mobile electronic device.

In another feature of this aspect, the second text message is sent after a preset time delay following the first text message being sent. In another feature of this aspect, the preset time delay is determined by a retailer accepting the purchase transaction.

In another feature of this aspect, the second text message is presented to the consumer in a manner attributable to a live person.

In another feature of this aspect, the method further includes providing an individualized retailer telephone number, unique to the retailer accepting the purchase transaction, to the consumer. In another feature of this aspect, the individualized retailer telephone number is assigned by a third party provider.

In another feature of this aspect, the first text message is sent after a preset time delay determined by a retailer accepting the purchase transaction.

In another feature of this aspect, the offer for an additional item expires after a preset time delay determined by a retailer accepting the purchase transaction.

In another feature of this aspect, the method further includes sending a third text message via the software application to the consumer to provide final shipping information if an additional time is purchased.

Broadly defined, the present invention according to another aspect includes a method for enabling automated upsell text messaging within shipping notification text messages as shown and described.

Broadly defined, the present invention according to another aspect includes a method for enabling automated upsell text messaging within shipping notification text messages using software application as shown and described.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Further features, embodiments, and advantages of the present invention will become apparent from the following detailed description with reference to the drawings, wherein:

FIG. 3 is a written summary of contemplated workflow steps of a method in accordance with one or more aspects of the present invention.

FIGS. 23-29 illustrate exemplary source code for exemplary methodologies in accordance with one or more preferred implementations.

DETAILED DESCRIPTION

Figure 1:
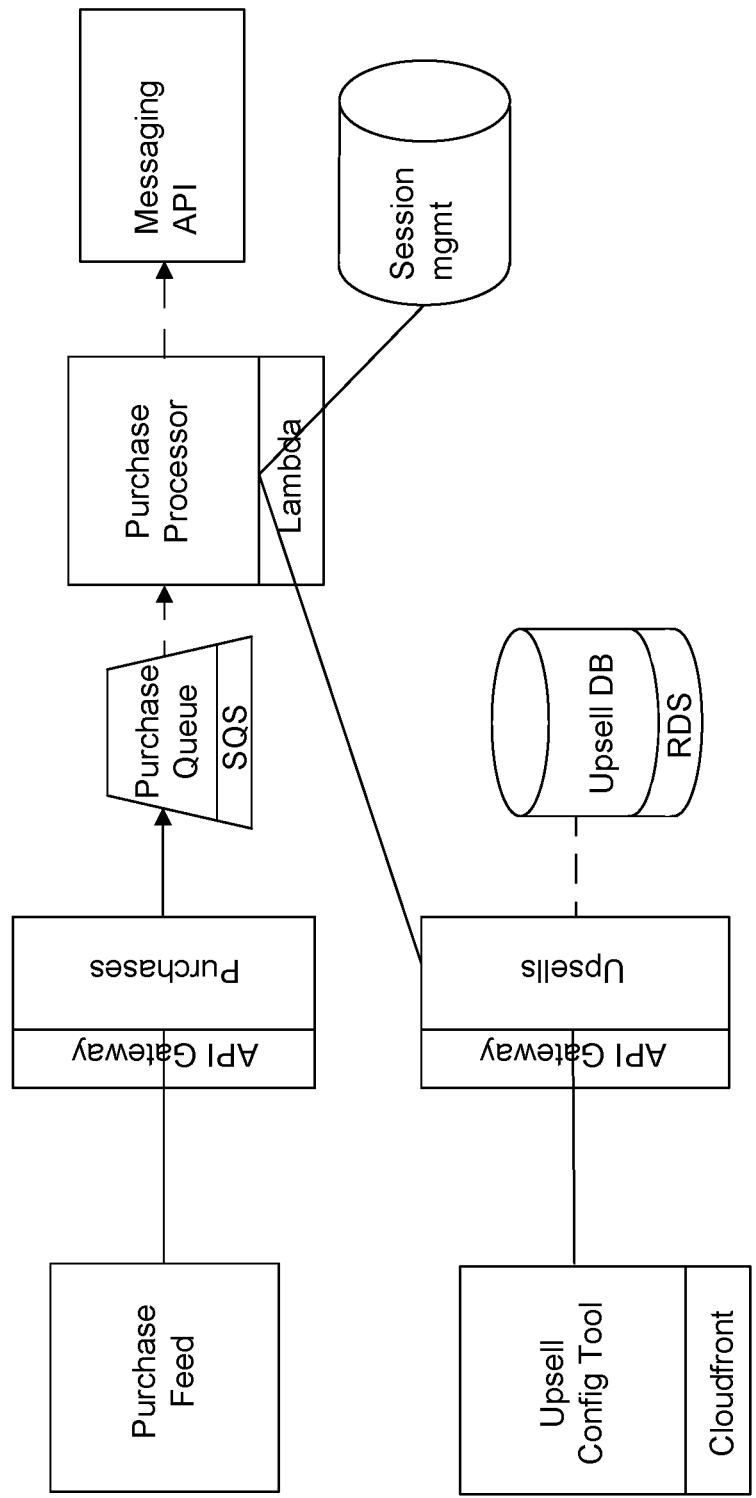
FIG. 1 is a diagram illustrating an architectural overview of a methodology and software product in accordance with one or more aspects of the present invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers," "a picnic basket having crackers without cheese," and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, in which like numerals represent like components throughout the several views, one or more preferred embodiments of the present invention are next described. The following description of one or more preferred embodiment(s) is merely exemplary in nature and is in no way intended to limit the invention, its application, or uses.

Methodology and a software product in accordance with one or more aspects of the present invention utilizes text messaging to enable future purchases directly with consumers via their electronic devices, in particular, their mobile electronic devices. It is contemplated that an upsell opportunity can be provided via text message to a consumer in conjunction with shipping details. It is further contemplated that future commercial transactions can be facilitated within a shipping notification exchange via text messaging on a mobile electronic device. In this regard, methodology and a software product in accordance with the present invention enable commerce all within a text messaging exchange, which a large percentage of the population is already very comfortable leveraging as a means of communication. It is contemplated that such exchanges can occur on any of a variety of different electronic devices, including mobile electronic devices.

An objective of the present invention is to position an additional product in a text message format to a recent buyer from a commercial retailer with the intent to generate more revenue seamlessly while providing shipping details. Once trust is earned with shipping information via text messaging, an "ask" to add a small impulse buy item can be made via the same text exchange. If a consumer replies with "buy," then the offered item can be added to the order. Over time, machine learning artificial intelligence can "learn" how to interact with buyers and position further product offerings that can seamlessly be purchased from inside text messages (i.e. without having to visit an online store).

In accordance with one or more aspects of the present invention, online commercial retailers can be directly engaged with customers via text messaging to provide an interactive experience using two-way text communication to sell products. The consumer simply needs to text the information to complete the transaction. Then the shopper has all the details saved inside the text stream of their mobile electronic device, and can access it later to purchase more products or even share purchases with friends or colleagues.

Text messaging is becoming more dynamic over time with "RCS Messaging" offered by GOOGLE. In this regard, it is contemplated that retailers can enable dynamic messages such as product images/videos/and even shopping inside the text message exchange (i.e. select color/size/text "buy.")

A software application is contemplated in accordance with one or more aspects of the present invention. In one or more embodiments, the software application integrates with ecommerce-focused businesses to help drive additional upsell opportunities via text messaging and capture the purchase during the text conversation. It is contemplated that the software application includes a configurable interface for a commercial retailer to choose what they want to upsell, what messages they want to send, and more.

It is contemplated that each commercial retailer can have their own unique 800 number and, in this manner, shoppers can receive text messages from that same number. In this regard, the software application can be used in conjunction with offerings from other providers such as, for example, an offering from BANDWIDTH (www.bandwidth.com) that specializes in sending and receiving text messages. Other provider offerings are likewise contemplated including, for example, a texting provider such as TWILIO (www.twilio.com). A consumer's personal mobile telephone number can be procured at "checkout" when a consumer opts in for "shipping notifications and other marketing messages."

In accordance with one or more embodiments, upselling inside text message shipping notifications includes an interface where a shopper enters their mobile phone number at checkout. An initial text confirming the number is returned with a confirmation that tracking information will be provided. Then, seemingly a real person (but not necessarily a real person) texts "Hi it's {name} from {company you just bought from}, do you want to add {another item} for only {$price} to your order?" It is contemplated that a retailer can customize the messaging exchange however they like. If the consumer replies "yes," an "ask" for the consumer to simply text "buy" in a return message is made. Once a "buy" message is received, the selected item is added to the order and the charge on the credit card is increased.

Figure 2:
FIG. 2 is a workflow diagram illustrating an overview of the steps of a method in accordance with one or more aspects of the present invention.

FIG. 1 is a diagram illustrating an architectural overview of a methodology and software product in accordance with one or more aspects of the present invention, and FIG. 2 is a workflow diagram illustrating an overview of the steps of a method in accordance with one or more aspects of the present invention. With reference to FIGS. 1 and 2, a consumer makes a purchase from an online retailer that is a MessageBuy client via a mobile electronic device. In the checkout process, the consumer opts-in to receive shipping notifications and other messages via text message. Their payment method is tokenized by the payment gateway used by the retailer, so that additional charges can be placed on the same card (without the consumer having to re-enter it every time).

MessageBuy software integrates with a retailer's ecommerce platform, and payment gateway, and captures consumers mobile phone number in order to send shipping details in text message format. MessageBuy software triggers a text message to a consumer, received at an electronic device, letting them know the order has been received and they will hear from the retailer shortly with a tracking number. They are also opted in to receive messages from the retailer, and can text STOP at any time to opt out.

Then another message is sent (time delay is configurable by retailer) appearing to be a real person asking the consumer if they want to add x item to their order before it ships at a discount (configurable by retailer). This can be characterized as an upsell offer. If the consumer texts back yes or buy, that additional charge is placed on the original payment method using the token, and it is added in with the shipment. The online retailer is made aware of the additional purchase by the consumer through MessageBuy software so they can consolidate the orders for the consumer.

A new automated shipping message in the form of a shipping notification is sent from MessageBuy with the assistance of a third-party partner that offers designated numbers that will individually be assigned to each MessageBuy client. This will allow each consumer to have an ongoing text message exchange with the retailer (i.e. for future text message purchases). The timing of when the shipping notification is sent out after purchase has been made is designated by the online retailer within the MessageBuy software.

If a consumer doesn't want an upsell offer, they can communicate that via text or decide to not respond at all. An online retailer will designate a set time period in MessageBuy software for how long the upsell offer should be in play. Once the order is finalized, either with the upsell or without, based on the designated time period, the MessageBuy software will send the final shipping details via text in order to summarize the total transaction.

Figure 4:
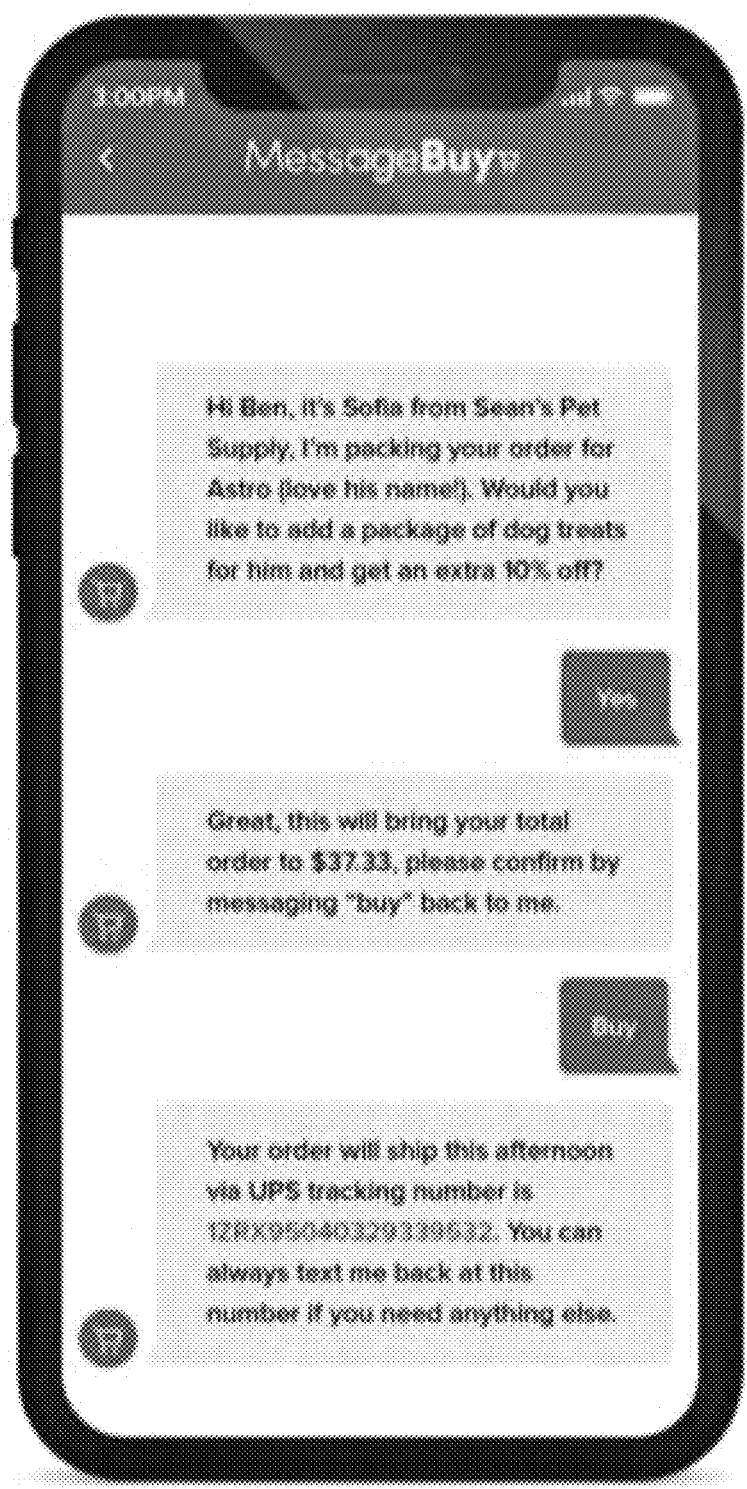
FIG. 4 is an image of a user interface modeled from the methodology of FIGS. 1-3, shown in the form of a text message exchange with a consumer via a mobile electronic device.
Figure 5:
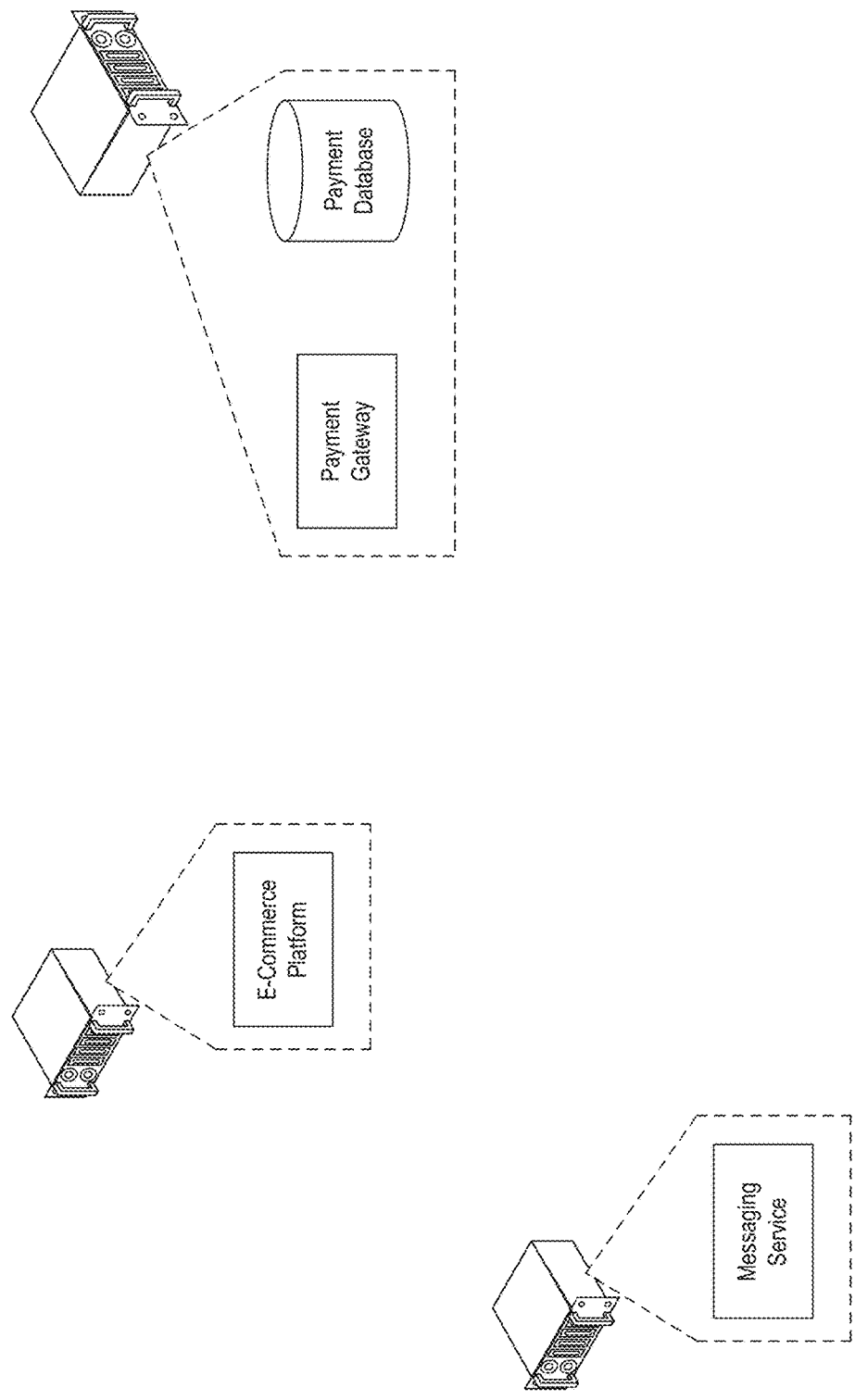
FIG. 5 illustrates an exemplary system including various platforms and services working together to enable electronic commerce.
Figure 6:
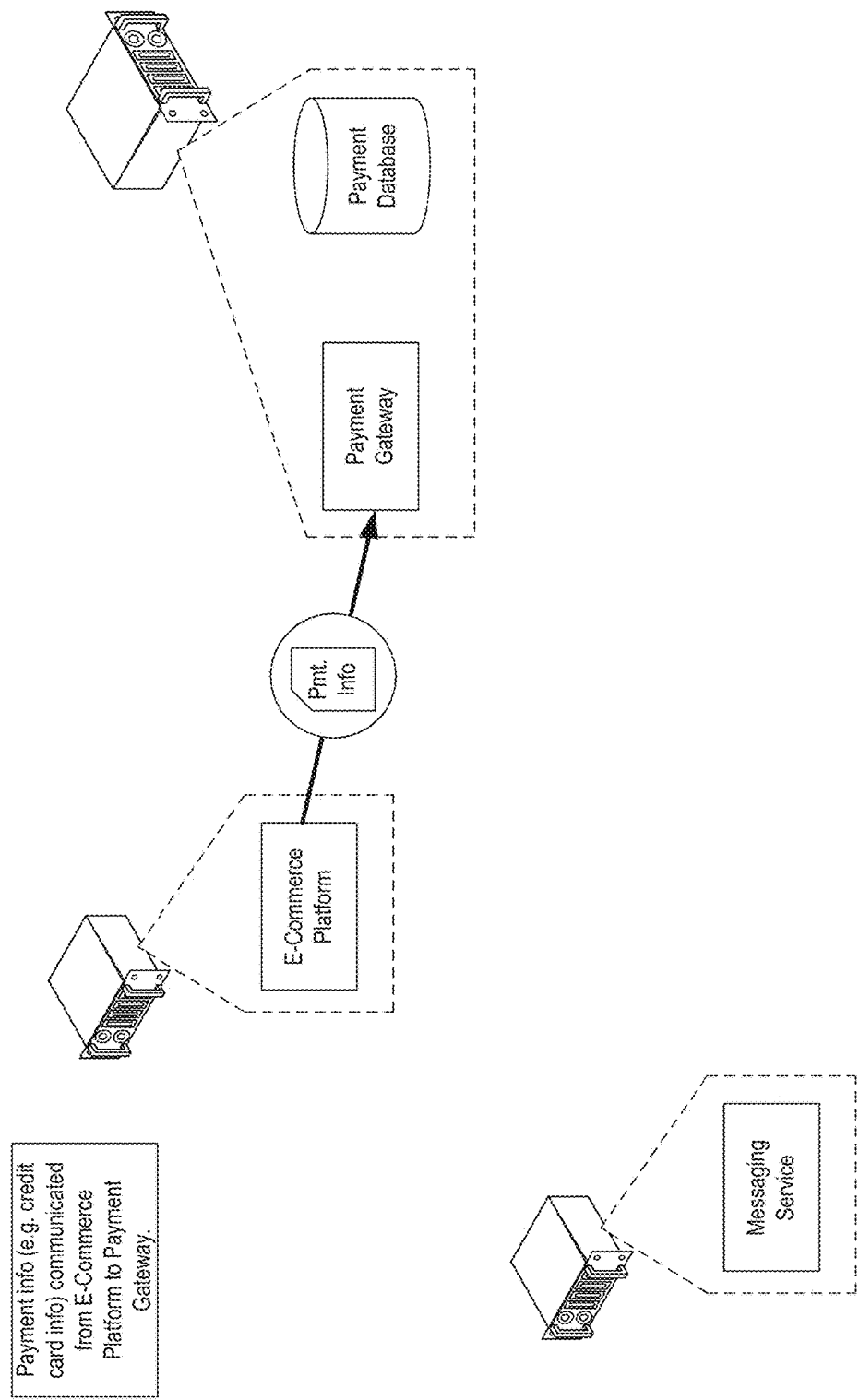
FIGS. 6-9 illustrate an exemplary method involving the exemplary system of FIG. 5.
Figure 7:
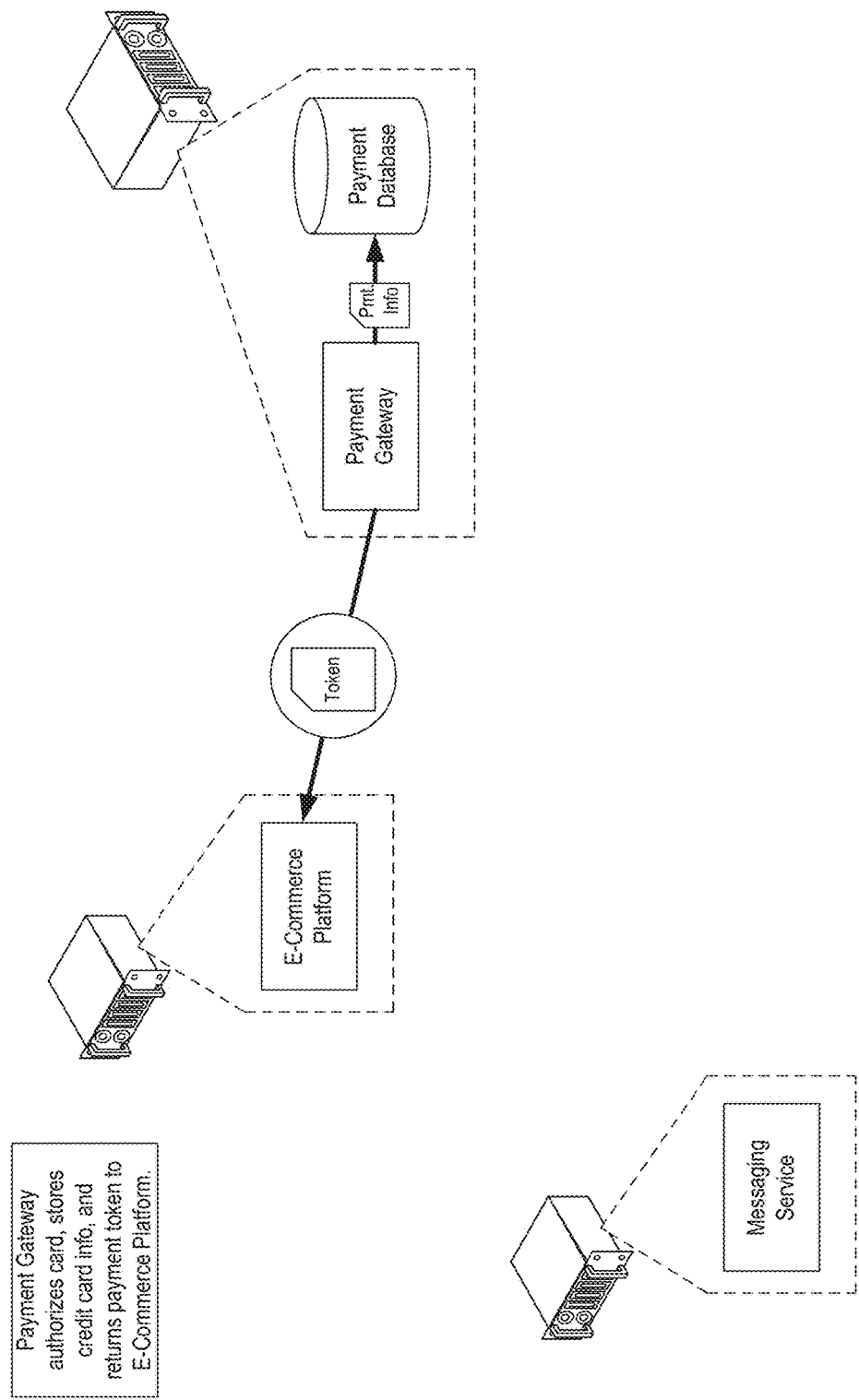
Figure 8:
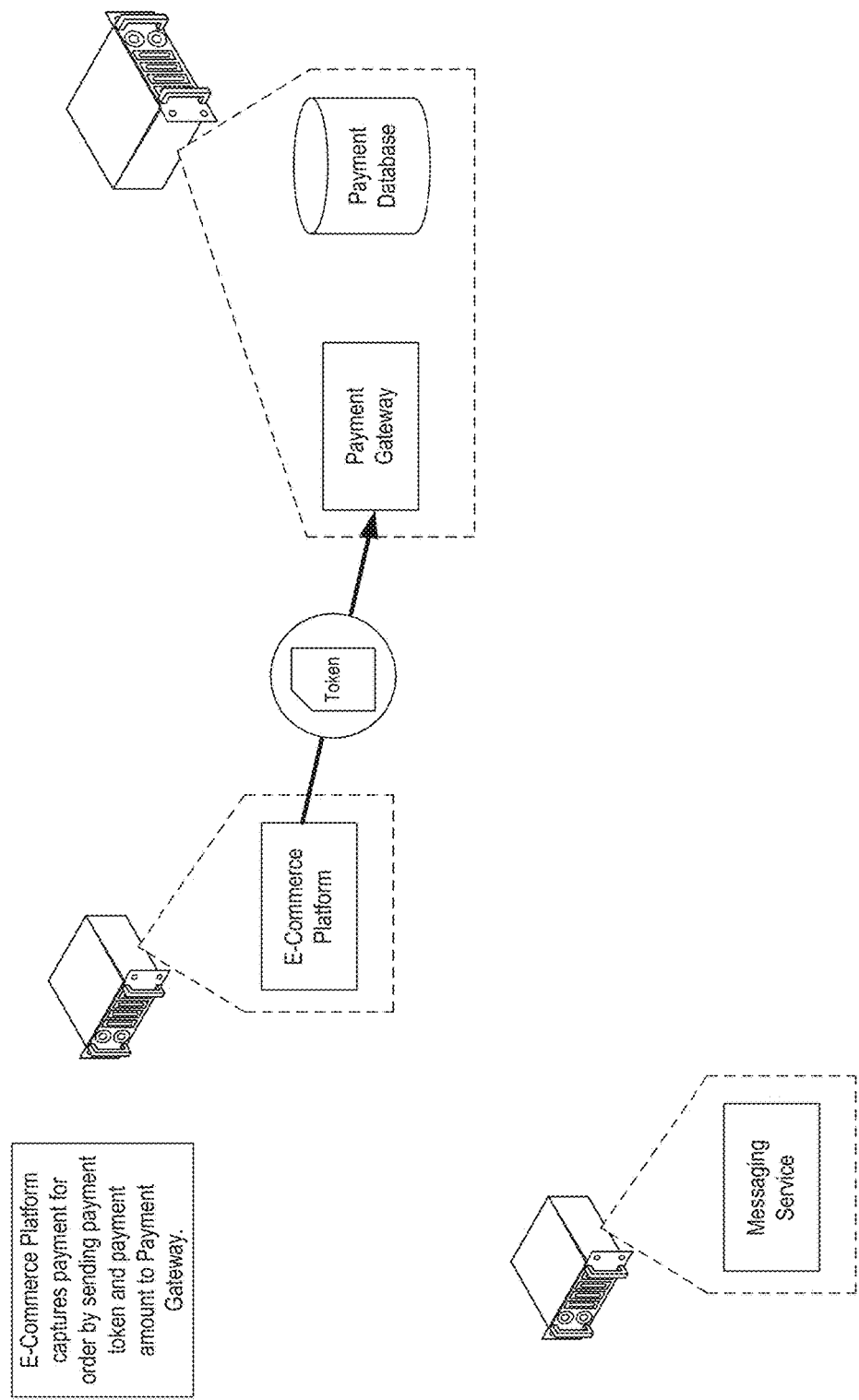
Figure 9:
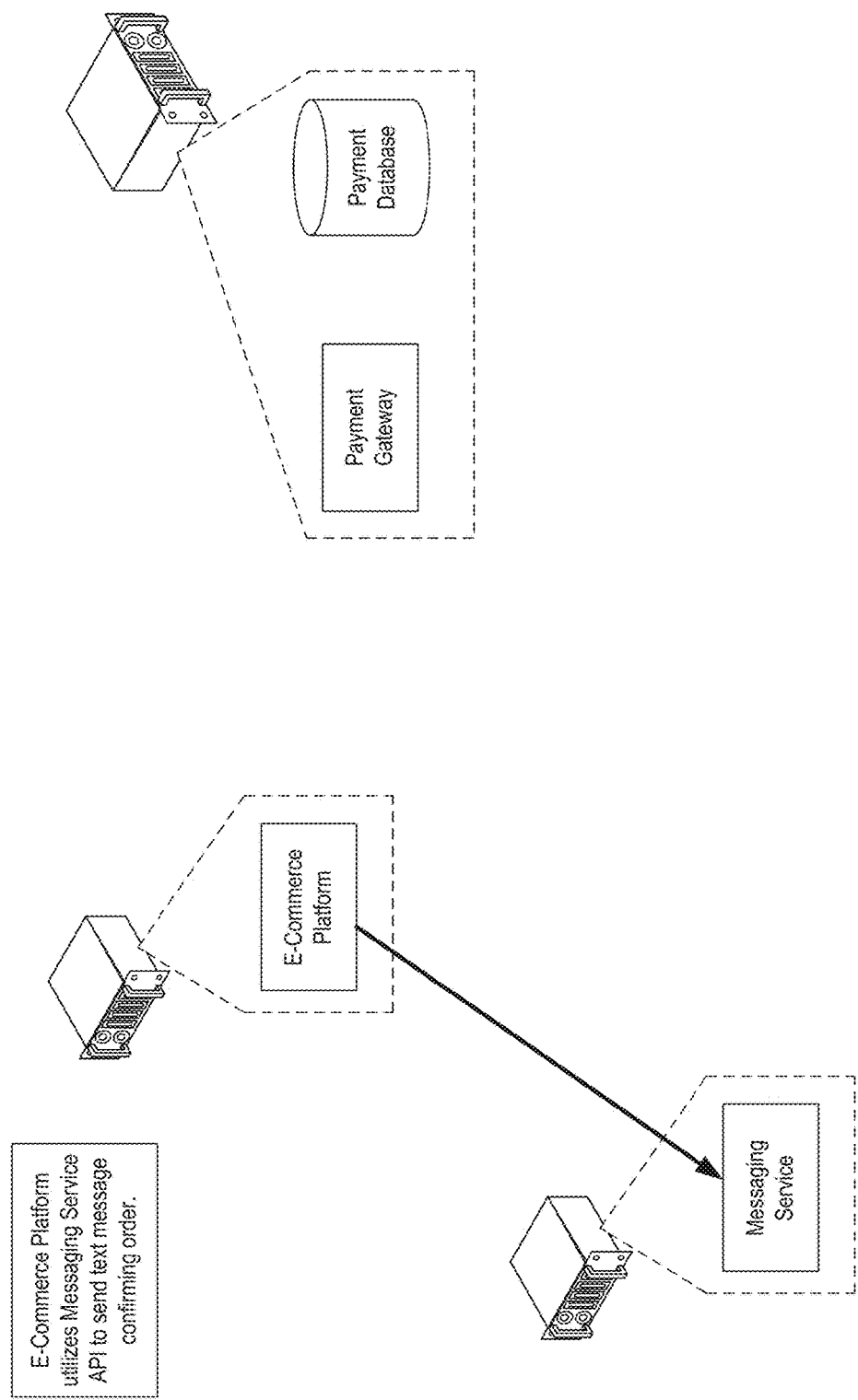

FIG. 3 is a written summary of contemplated workflow steps of a method in accordance with one or more aspects of the present invention. FIG. 4 is an image of a user interface modeled from the methodology of FIGS. 1-3, shown in the form of a text message exchange with a consumer via a mobile electronic device.

A benefit of a methodology and software product in accordance with one or more aspects of the present invention involves the ability to offer timely messages to a customer that urges them to increase the total cart value or order amount. It is contemplated that this would generally be at a small incremental price, higher-margin, limited-time offer, and/or impulse buys. Such purchases would be able to be added on to the existing order without changes in shipping cost or time. The consumer can complete the upsell simply by texting confirmation and would not need to visit any additional website/mobile app/or other place to re-enter payment information.

Figure 10:
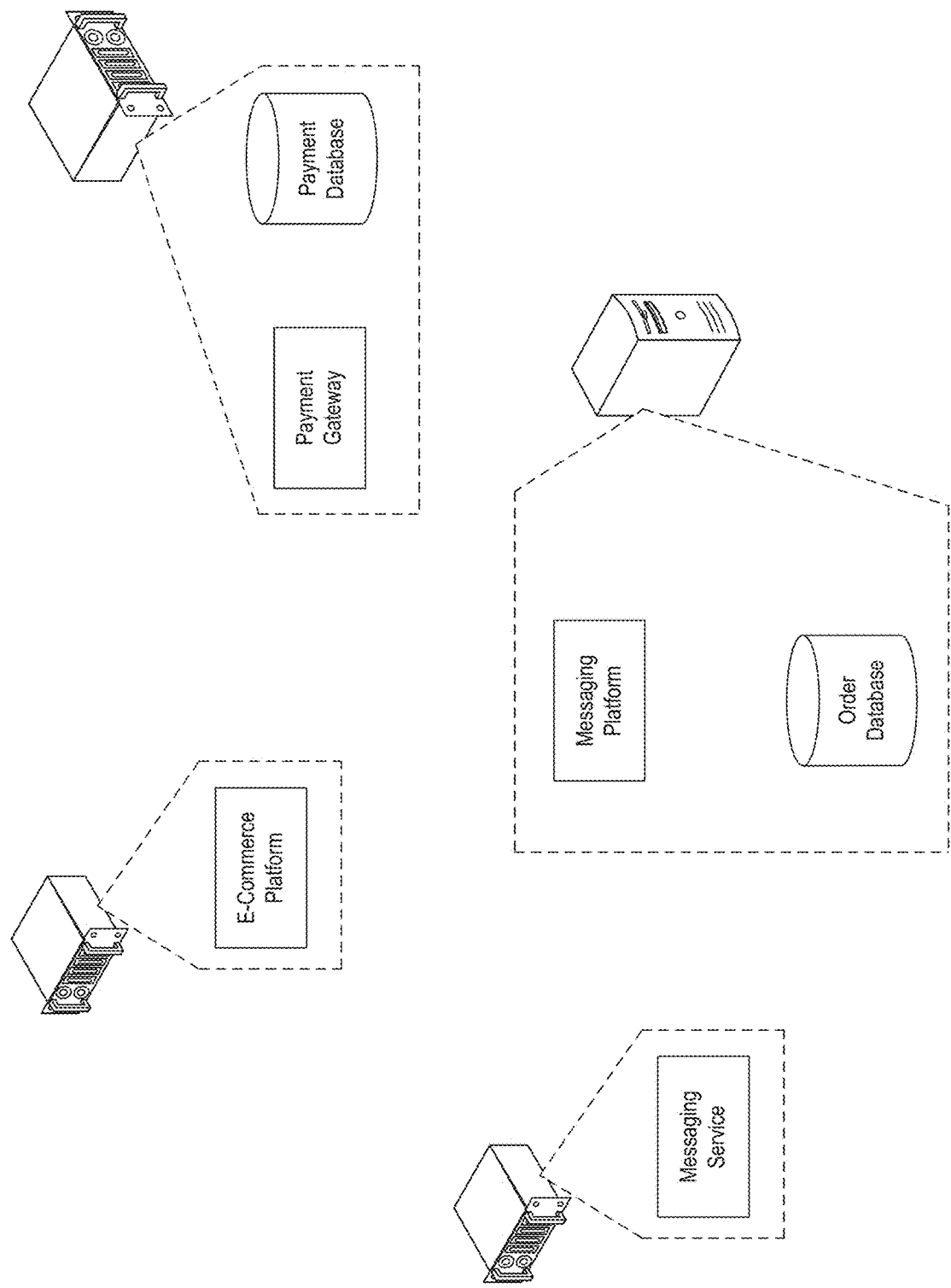
FIG. 10 illustrates an exemplary system in accordance with one or more preferred implementations including various platforms and services working together to enable electronic commerce.

FIG. 10 illustrates an exemplary system in accordance with one or more preferred implementations including various platforms and services working together to enable electronic commerce. This system includes an E-Commerce Platform (such as WooCommerce, Magenta, or Shopify), a Payment Gateway (such as Autorize.net), a Messaging Service (such as Bandwidth.com) which is configured to send SMS or MMS messages, and a Messaging Platform which is configured to facilitate methods for upselling as described herein. It will be appreciated that although components of this system are fancifully illustrated as a single server or computer, each platform or service may be implemented utilizing one or more real or virtual machines running at a single or multiple locations, e.g. may be implemented as cloud platforms or services.

Figure 11:
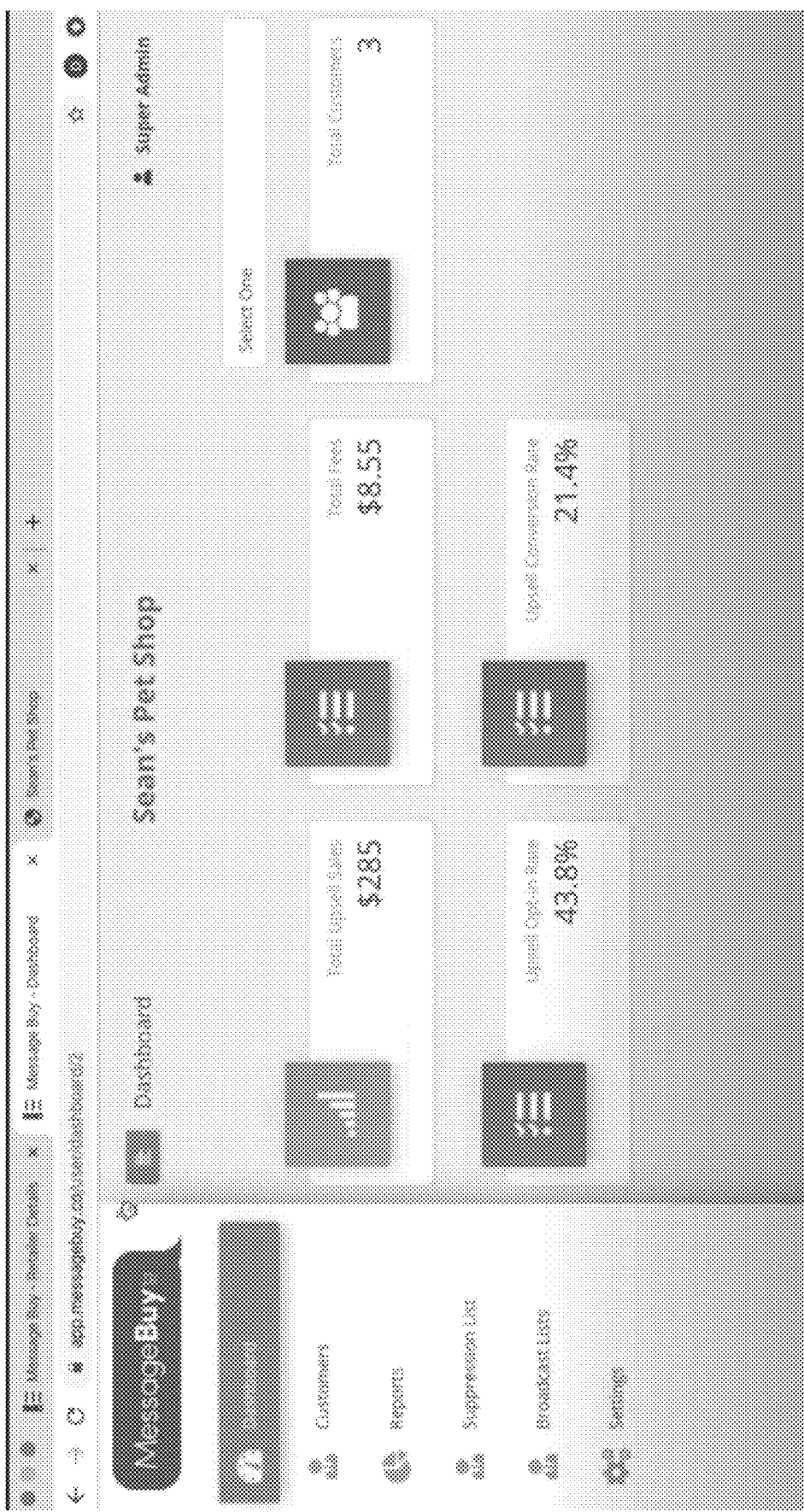
FIGS. 11-22 illustrate steps of one or more exemplary methodologies in accordance with one or more preferred implementations.

FIG. 11 illustrates a dashboard interface of a configuration tool of the Messaging Platform which is accessible to a retailer user via a web browser or mobile app and allows a retailer user to view metrics related to upsell offers for one or more E-Commerce apps or sites implemented utilizing one or more E-Commerce Platforms.

Figure 12:
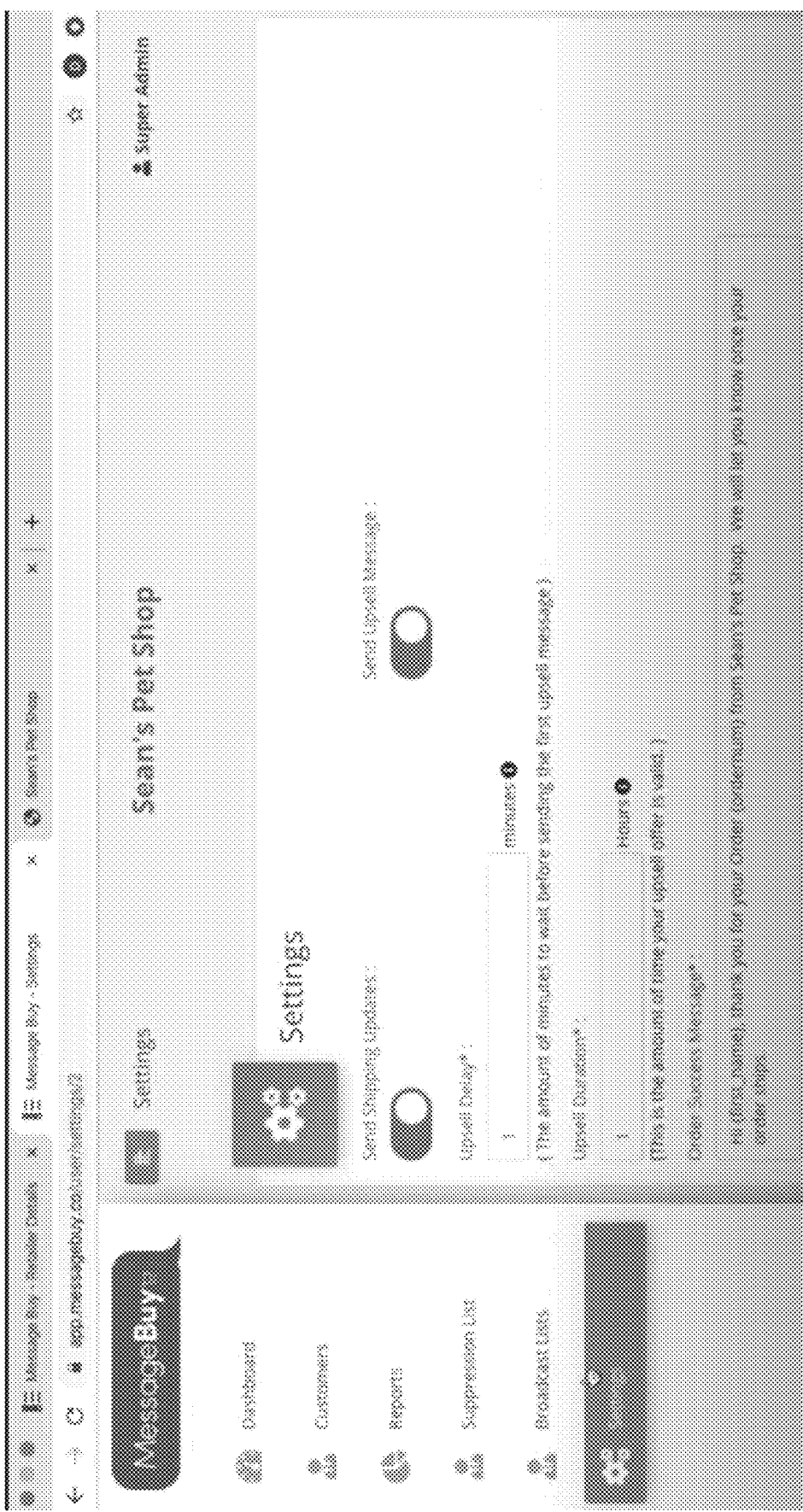
Figure 13:
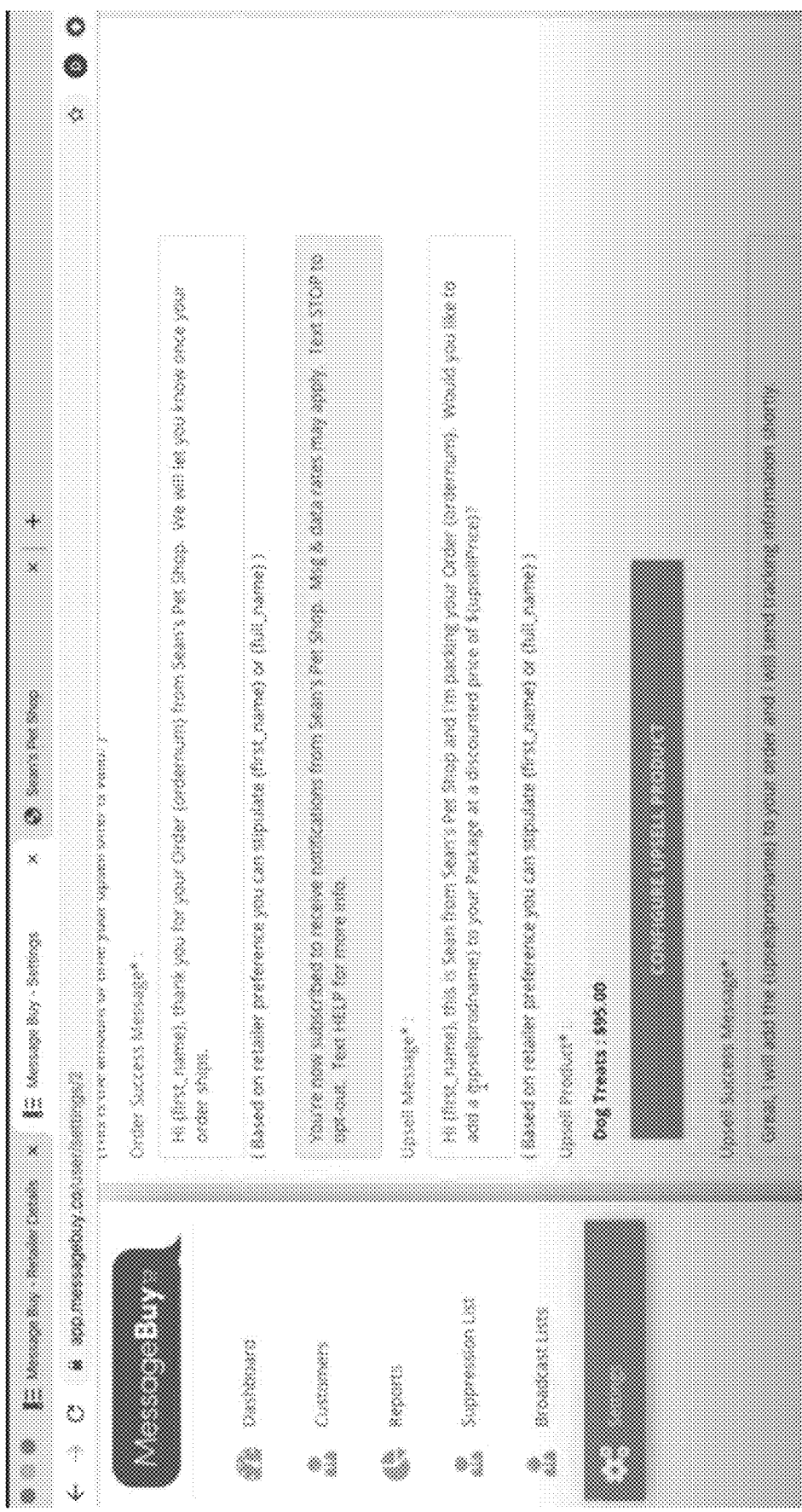

FIGS. 12-13 illustrate a settings interface of a configuration tool of the Messaging Platform which is accessible to a retailer user via a web browser or mobile app and allows a retailer user to view metrics related to upsell offers for one or more E-Commerce apps or sites implemented utilizing one or more E-Commerce Platforms. Using the settings interface, a user can specify an upsell delay representing a time between order completion and an upsell offer text message, and an upsell duration representing a length of time that an upsell offer is valid. A user can further specify an order success message which can include variables for automatic replacement with a first name or first and last name of a customer and for automatic replacement with an order number. A user can also specify an upsell message which can include variables for automatic replacement with a first name or first and last name of a customer and for automatic replacement with an order number, and for automatic replacement with a name and price of a product that is to be offered for upsell. A user can also specify an upsell success message which can include variables for automatic replacement with a first name or first and last name of a customer and for automatic replacement with an order number, and for automatic replacement with a name and price of a product that has been accepted for upsell.

The settings interface preferably allows a user to configure an upsell product to be offered, and an upsell price for that product. In accordance with one or more preferred implementations, the interface is configured to allow a user to configure a plurality of upsell products that may be offered based on different variables such as the product or products already ordered, the location of the customer, the sex of the customer, the total amount of the order, an order history of the customer, etc. In accordance with one or more preferred implementations, an AI engine or machine leaning engine may be utilized to generate upsell product offers, and settings for such an engine and available products for offer may be user configurable.

Figure 14A:
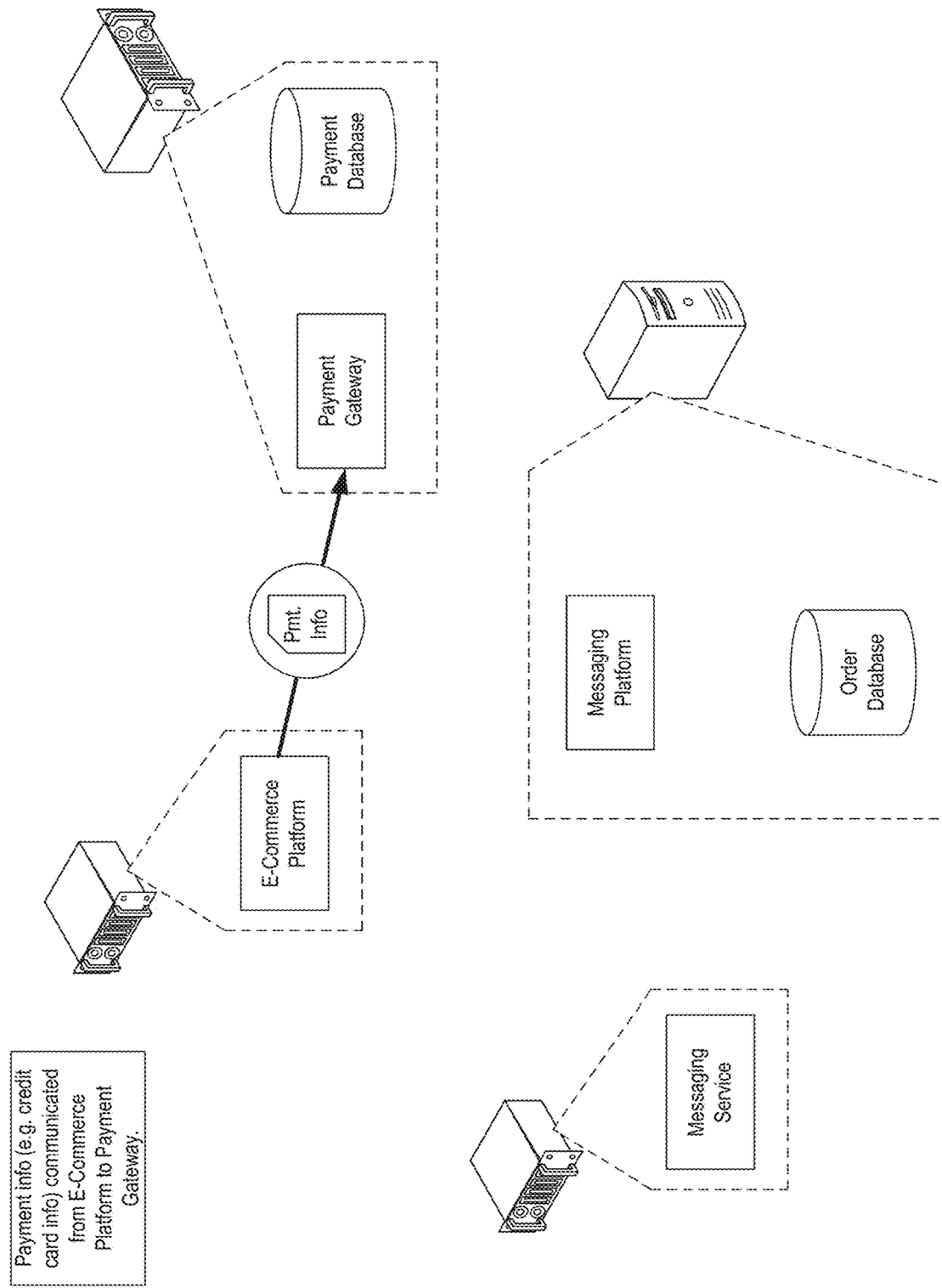

In a method in accordance with one or more preferred implementations, a customer user uses a web browser or app to browse one or more interfaces of a page, site, or app of the E-Commerce Platform, and acts to purchase one or more items or services (e.g. by adding them to a shopping cart and checking out). The customer is prompted to input payment information such as a credit card number via an interface of the E-Commerce Platform, and payment information is communicated from the E-Commerce Platform to the Payment Gateway for authorization, as illustrated in FIG. 14A. (Alternatively, a user may be prompted to input payment information via an interface associated with the Payment Gateway, e.g. an interface that is embedded or that a web browser is directed to before being redirected to a page of the E-Commerce Platform.)

Figure 14B:
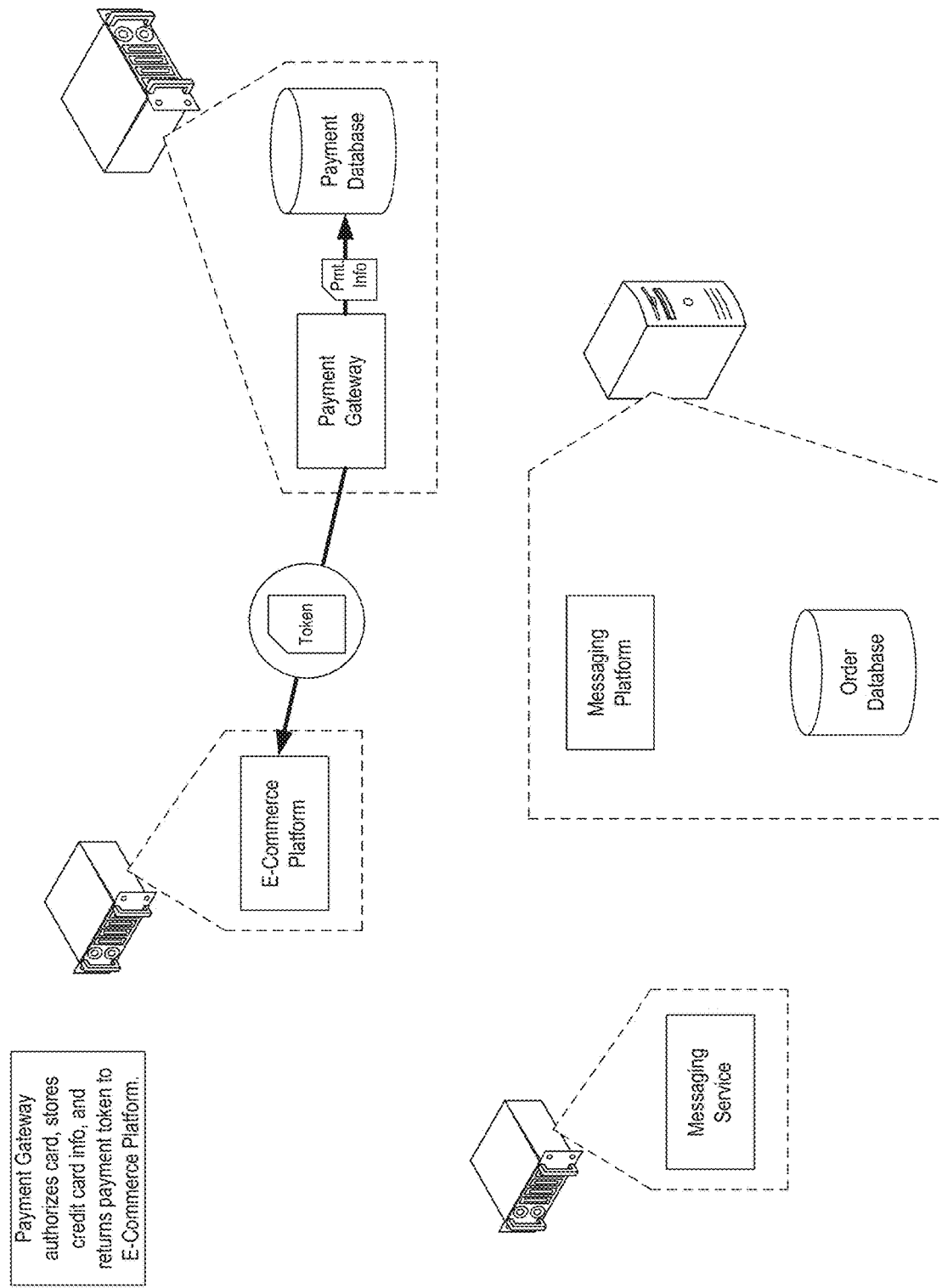

The Payment Gateway authorizes the payment information, stores payment information (e.g. credit card information), and returns a payment token to the E-Commerce Platform, as illustrated in FIG. 14B. (The payment token can be used to subsequently capture the amount for the order by communicating the payment token together with a payment amount to the Payment Gateway. This might happen immediately upon order confirmation, or at a later time.)

Figure 15A:
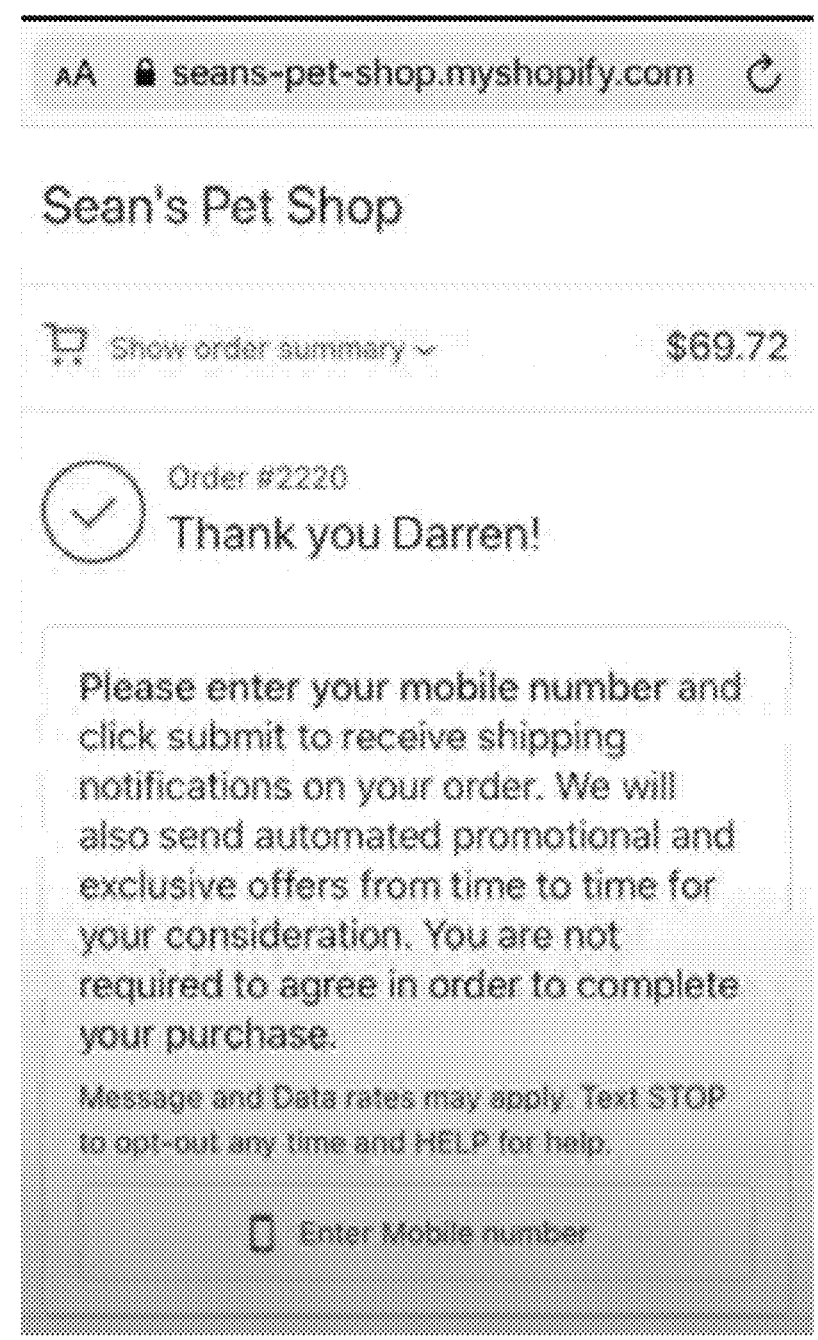
Figure 15B:
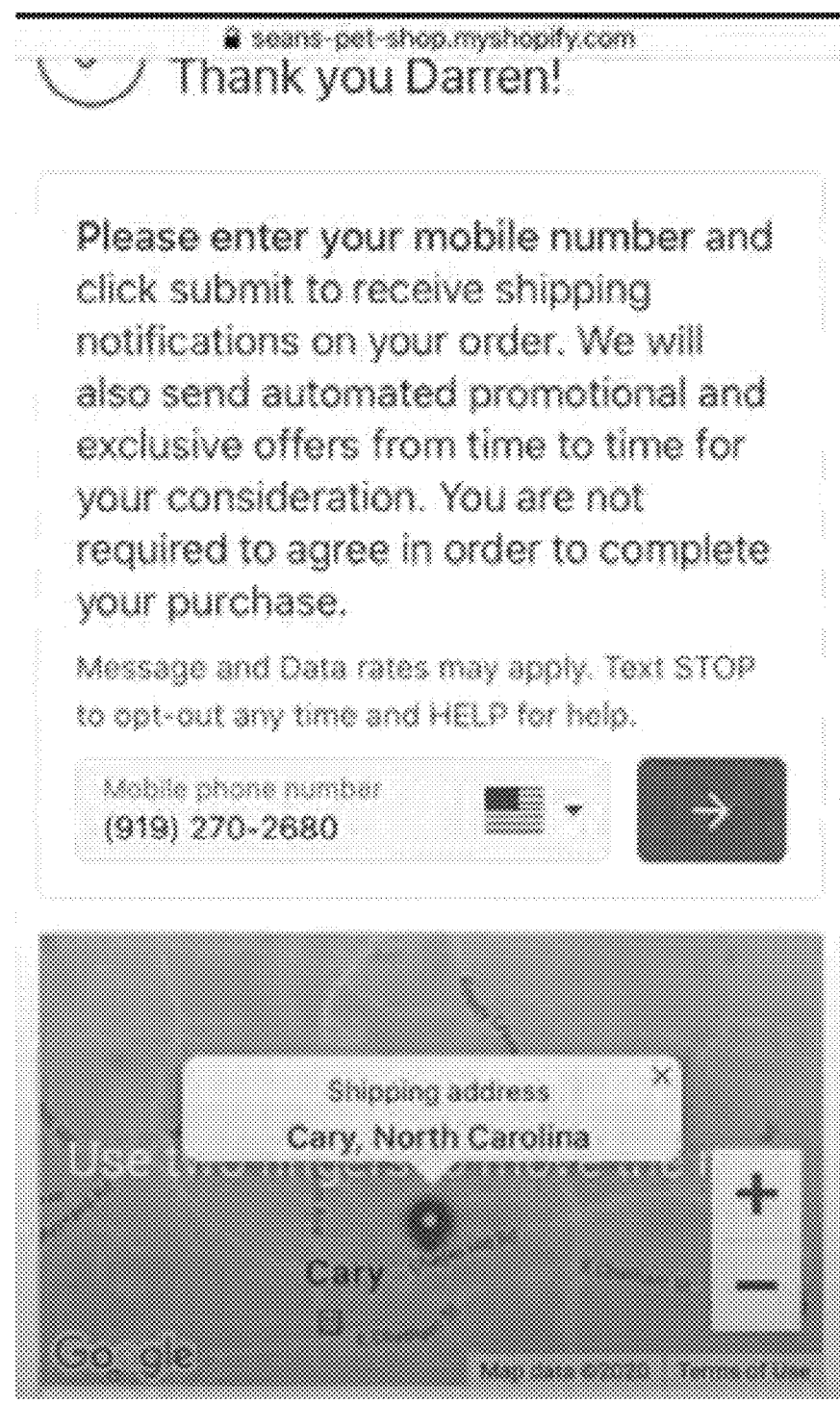

The E-Commerce Platform receives payment authentication from the Payment Gateway, takes any necessary steps to confirm and complete the order, and prompts the customer user to opt in to text messages, as illustrated in FIGS. 15A-15B. The customer user is preferably prompted to opt in to receive shipping notifications via their mobile number simultaneously with opting in to receive automated promotional offers. FIG. 23 illustrates exemplary code for an opt in process.

Figure 16A:
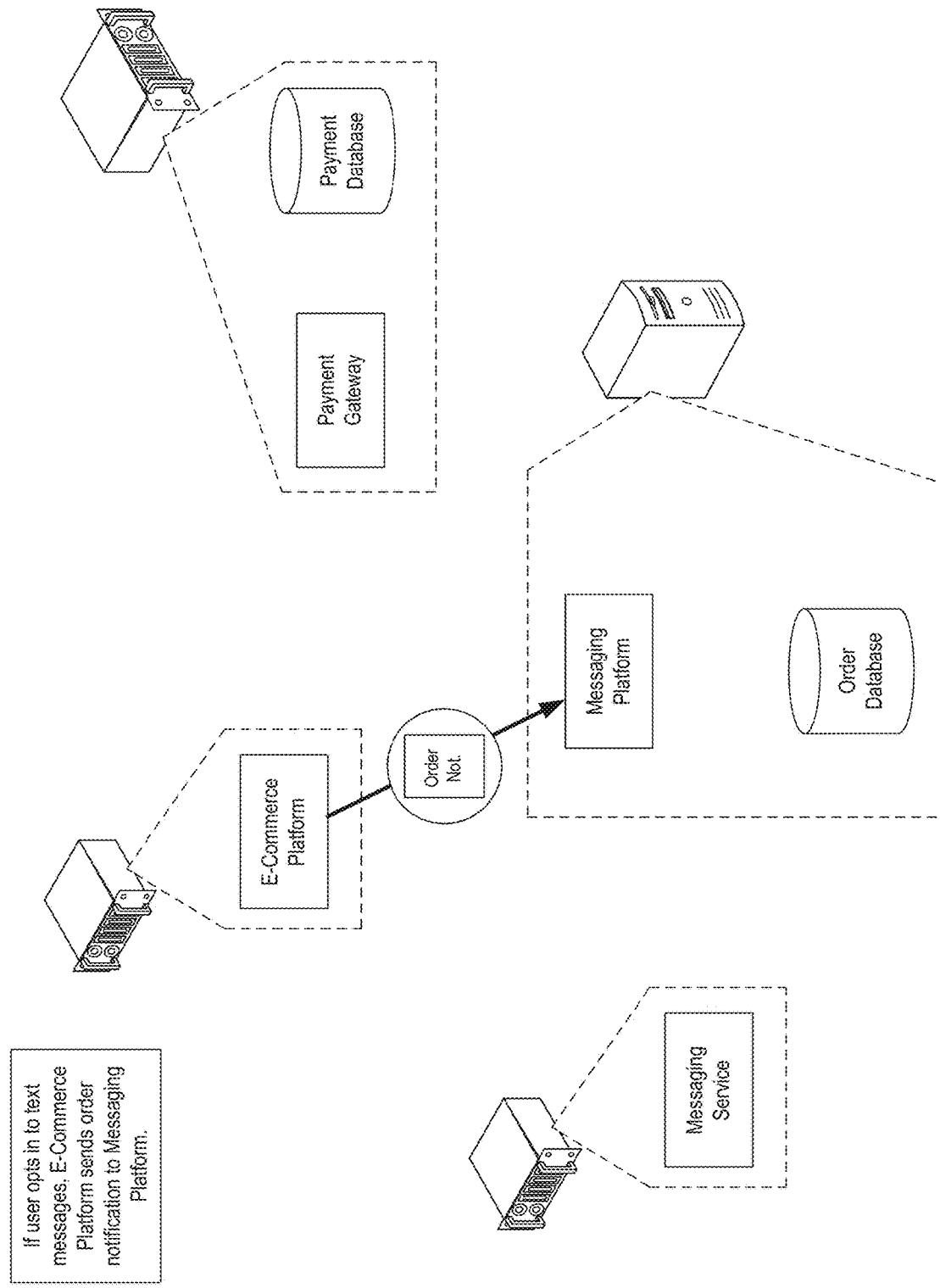

If the customer user has opted in to receive text messages via a provided number, or had already opted in via a saved number, the E-Commerce Platform sends an order notification to the Messaging Platform including an indication of the completed order, as illustrated in FIG. 16A. Preferably, the E-Commerce Platform has a webhook notification on order creation which is utilized to effect sending of the notification.

Figure 16B:
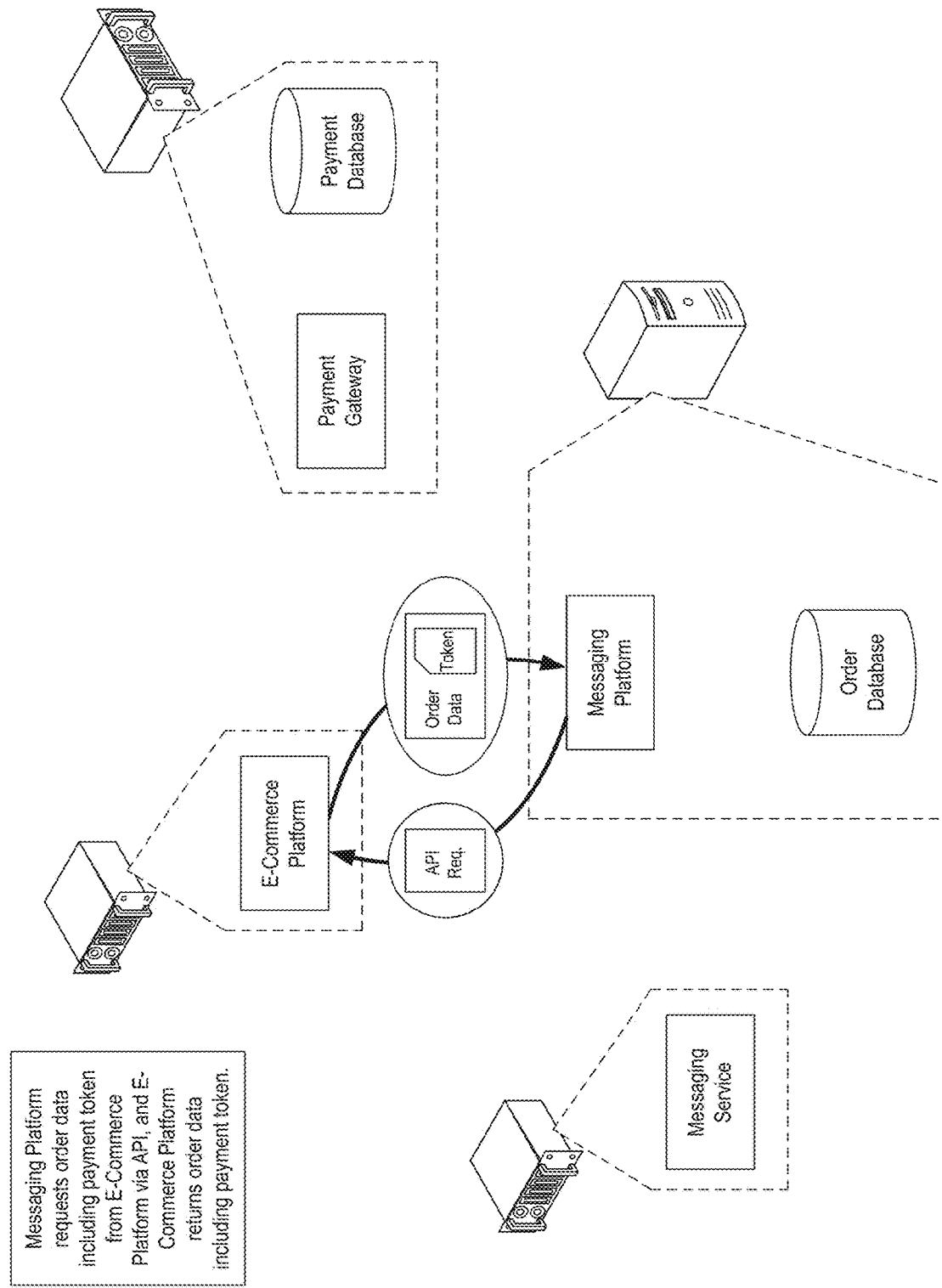

If this notification does not include sufficient order information (e.g. does not include the associated payment token), the Messaging Platform requests any needed order data including the payment token from the E-Commerce Platform via an API of the E-Commerce Platform, and the E-Commerce Platform returns this requested data, as illustrated in FIG. 16B.

Figure 16C:
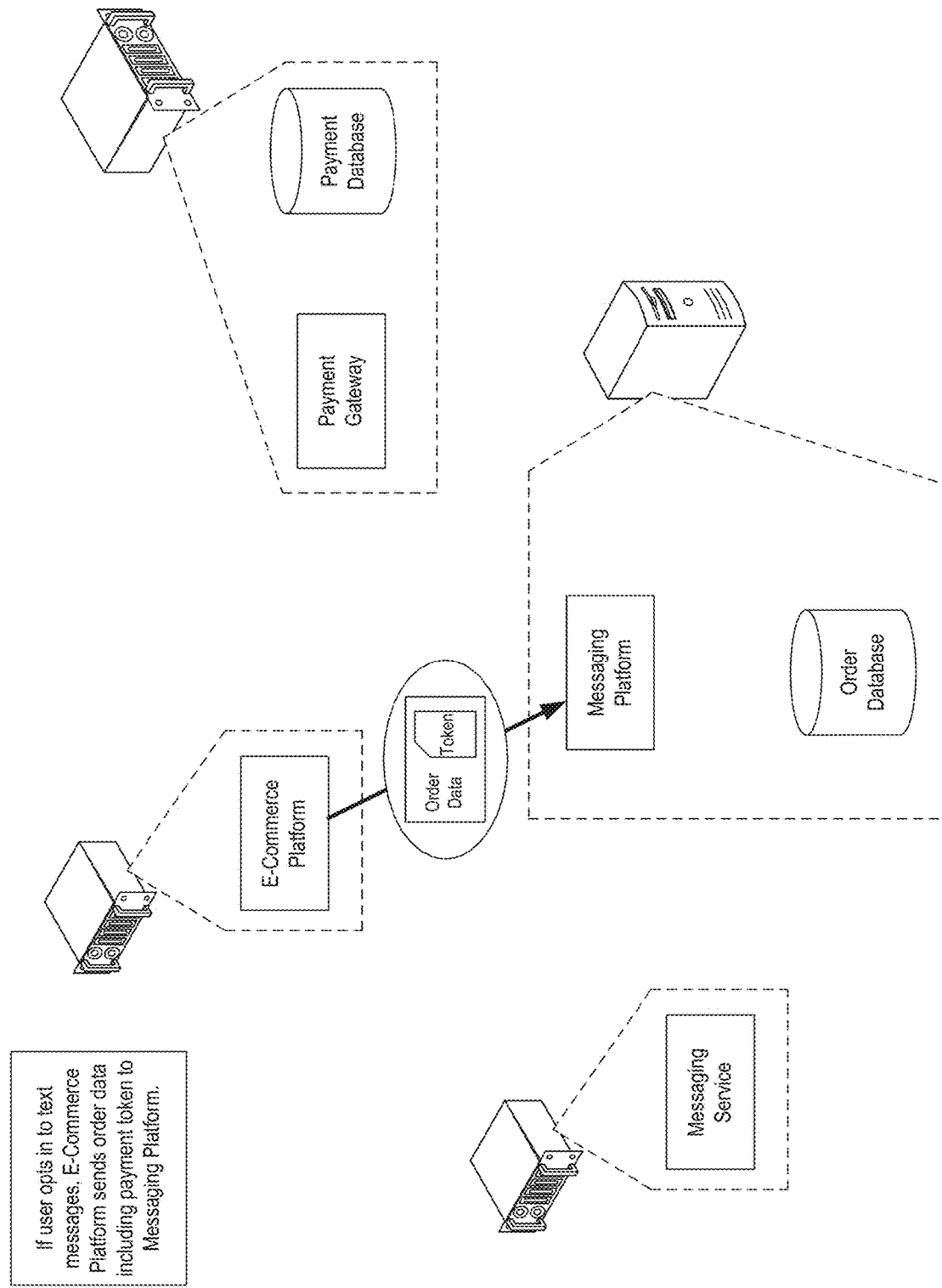

Preferably, though, the E-Commerce Platform sends the desired order information including the payment token to the Messaging Platform as part of the webhook notification on order creation, as illustrated in FIG. 16C.

Figure 16D:
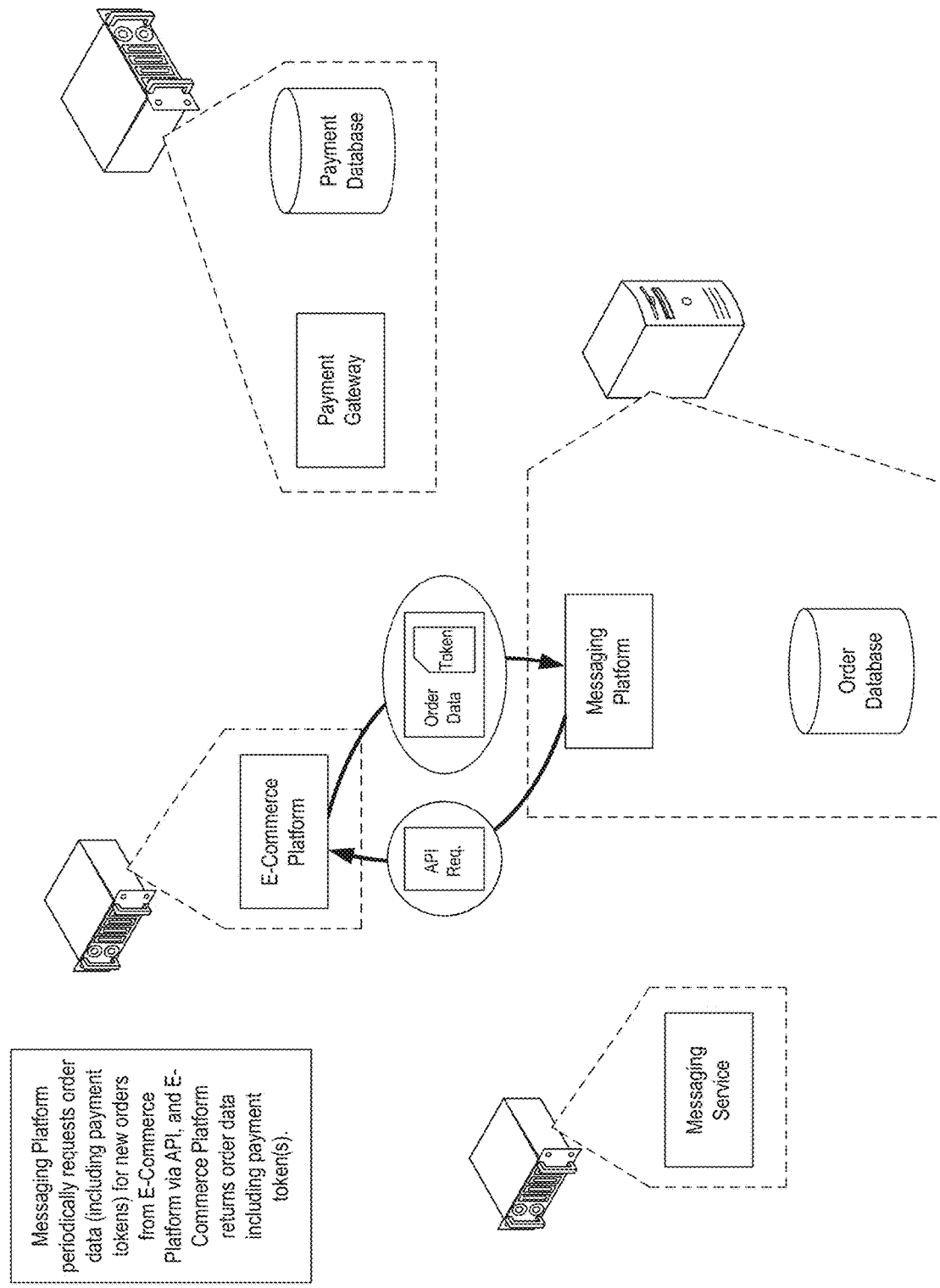

In accordance with one or more preferred implementations, the E-Commerce Platform is not configured to automatically send an order notification, and instead the Messaging Platform periodically polls the E-Commerce Platform to request order data for any new orders, and the E-Commerce Platform returns order data including a payment token for any new orders, as illustrated in FIG. 16D.

Figure 17A:
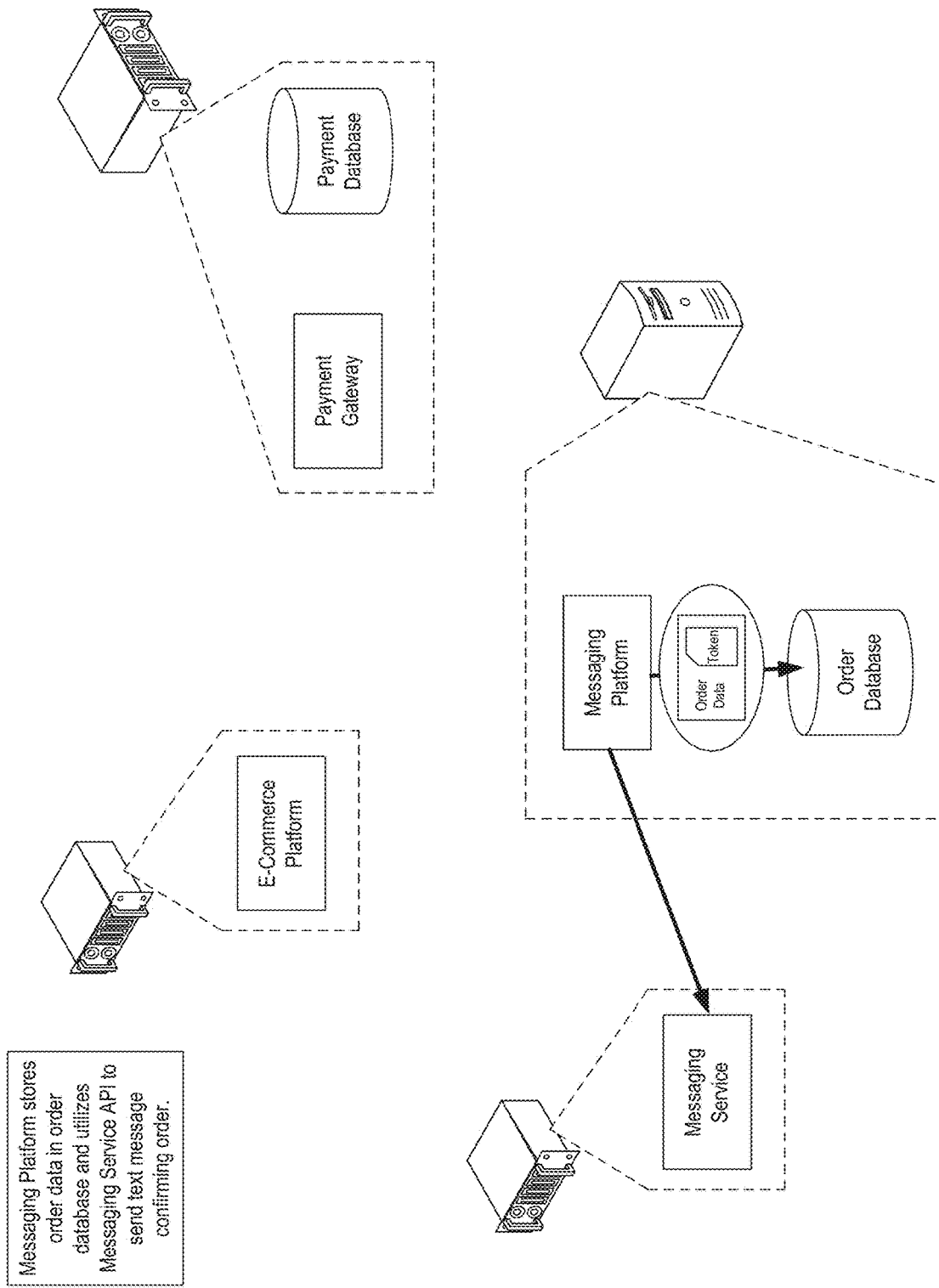
Figure 17B:
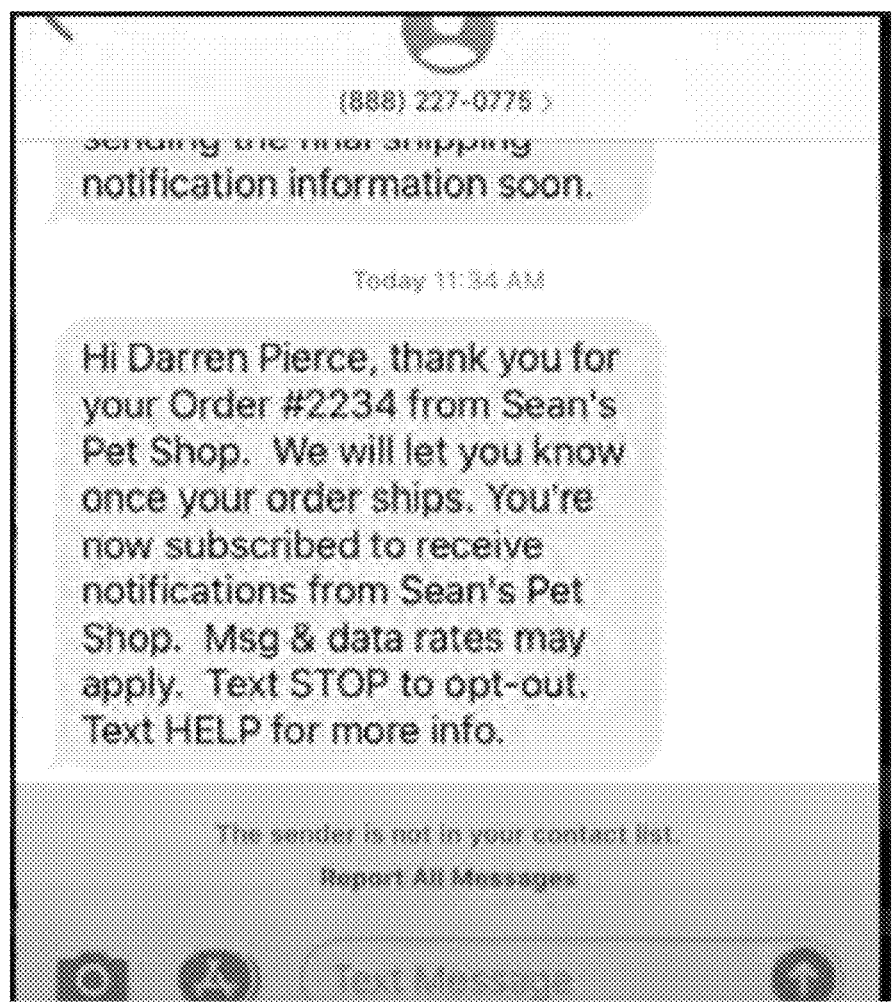

Once the Messaging Platform has the order data, the Messaging Platform stores the order data including the payment token in its order database and utilizes an API of the Messaging Service to send a text message confirming the order, as illustrated in FIGS. 17A-17B. The payment token is stored in association with the phone number that the customer user has just recently or previously provided and authorized for text communications. The payment token is preferably stored for twelve months or more.

Next, the Messaging Platform, based on the user configured settings, determines that the user-configured amount of time has passed for the upsell delay, and determines, based on the user-configured settings, one or more upsell offer items or services and corresponding upsell price(s) for an upsell offer. FIGS. 24A-24B illustrate exemplary code for determining or retrieving an upsell product for an existing order.

Figure 18A:
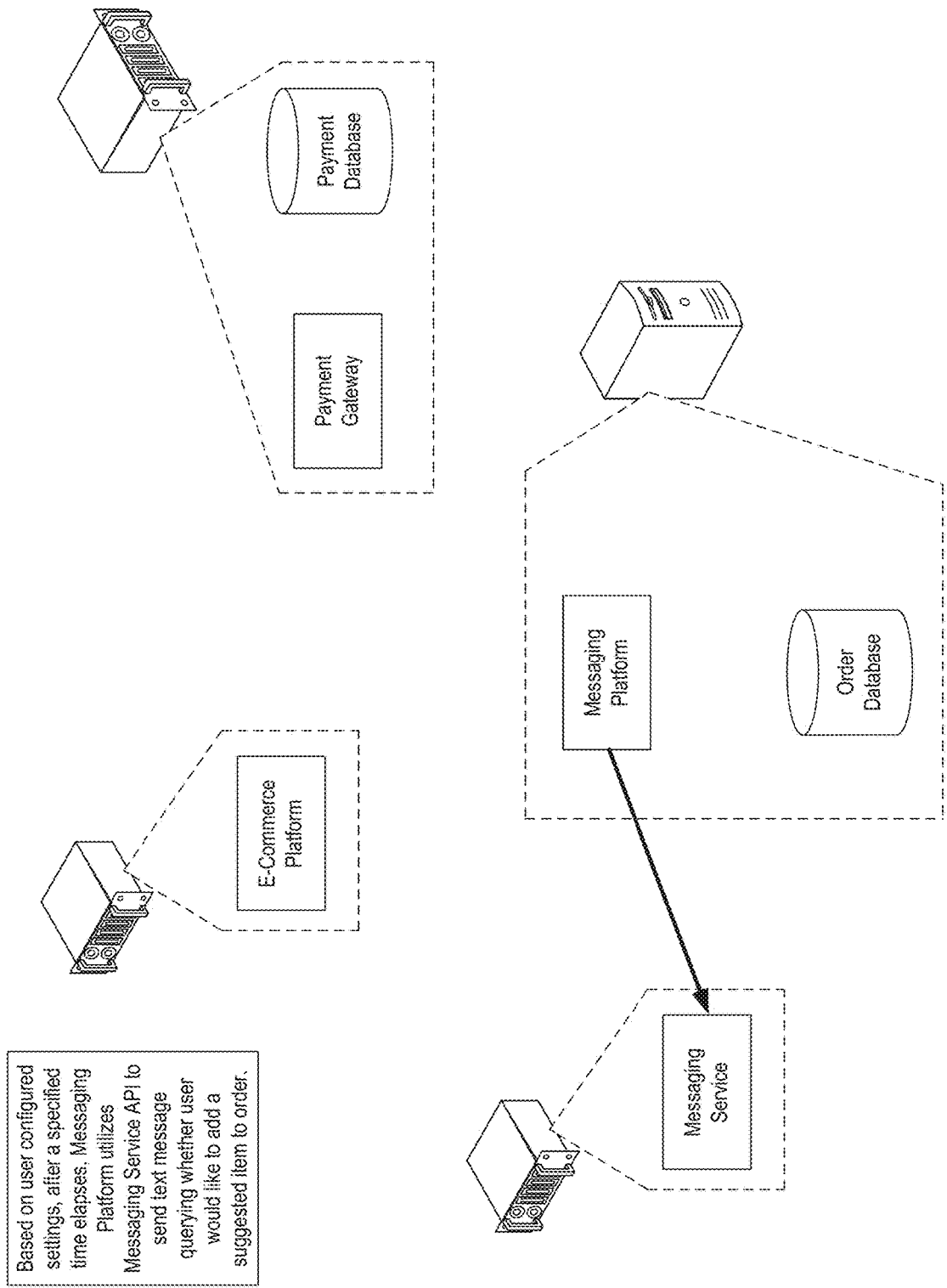
Figure 18B:
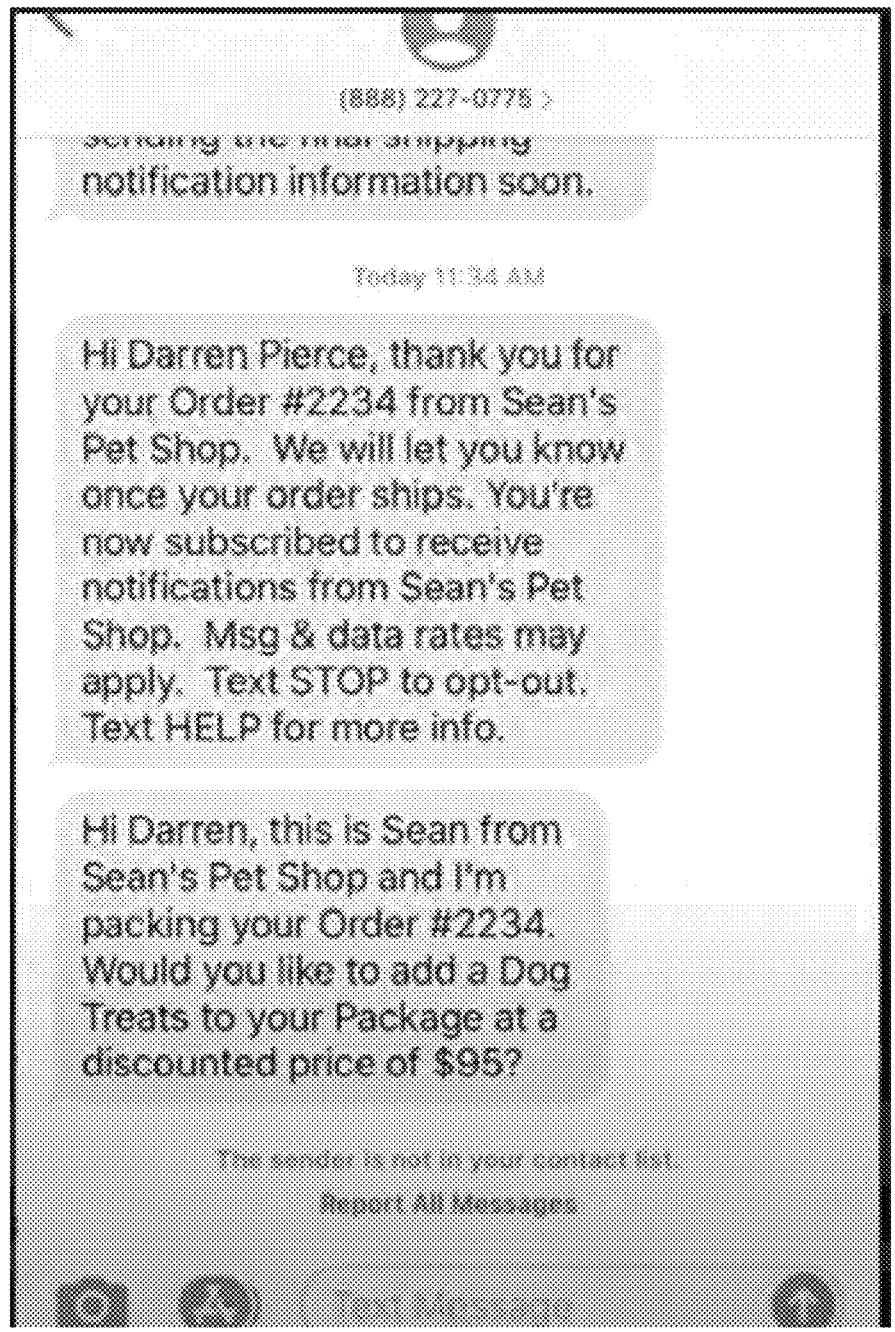

The Messaging Platform utilizes the API of the Messaging Service to send a text message to the phone number provided by or associated with the customer user (which was included in the communicated order data or requested via the E-Commerce Platform API) querying whether the customer user would like to add the items or services for the corresponding price(s) to the prior order, as illustrated in FIGS. 18A-18B.

FIG. 25 illustrates exemplary code for sending an upsell message based on a template stored in a database. An exemplary message template is: "{retailer_name}: Hi {customer_name}, your Order #{order_number} is currently being packed. Would you like to add a {upsell_product_name} to your Package for a special discounted price of ${upsell_product_discount_price} (regularly ${upsell_product_price})? Reply YES to order."

Figure 19:
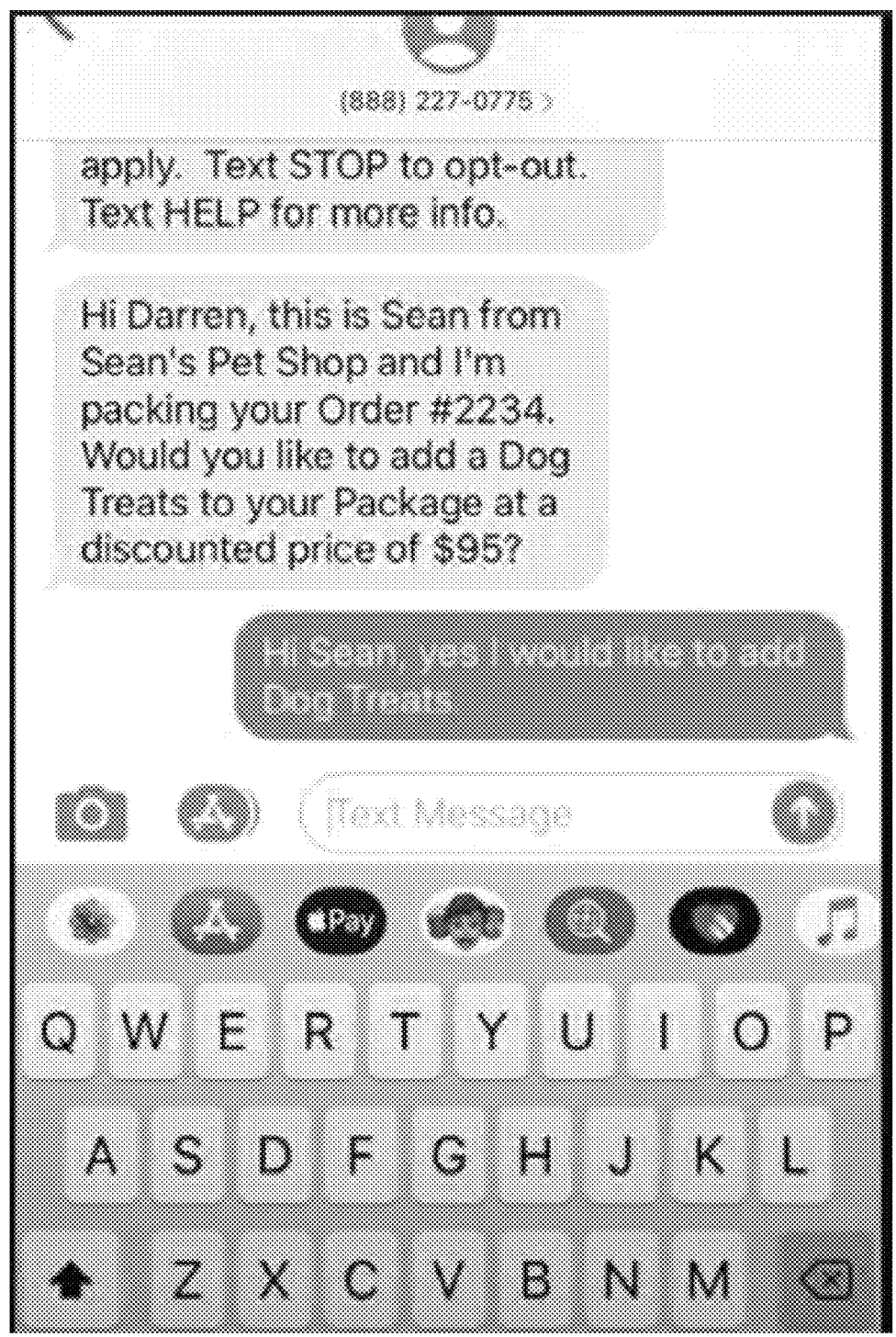

The customer user can respond to the text indicating whether they would like to accept the upsell offer, as illustrated in FIG. 19. The response is provided back to the Messaging Platform by the Messaging Service and analyzed by a language engine. This language engine may be an AI engine and may utilize machine learning. Additionally or alternatively, in at least one or more preferred implementations, the upsell offer text includes an indication to respond with a certain text string (e.g. "YES" to accept). FIG. 26 illustrates exemplary code for processing a received response to an upsell offer.

Figure 20:
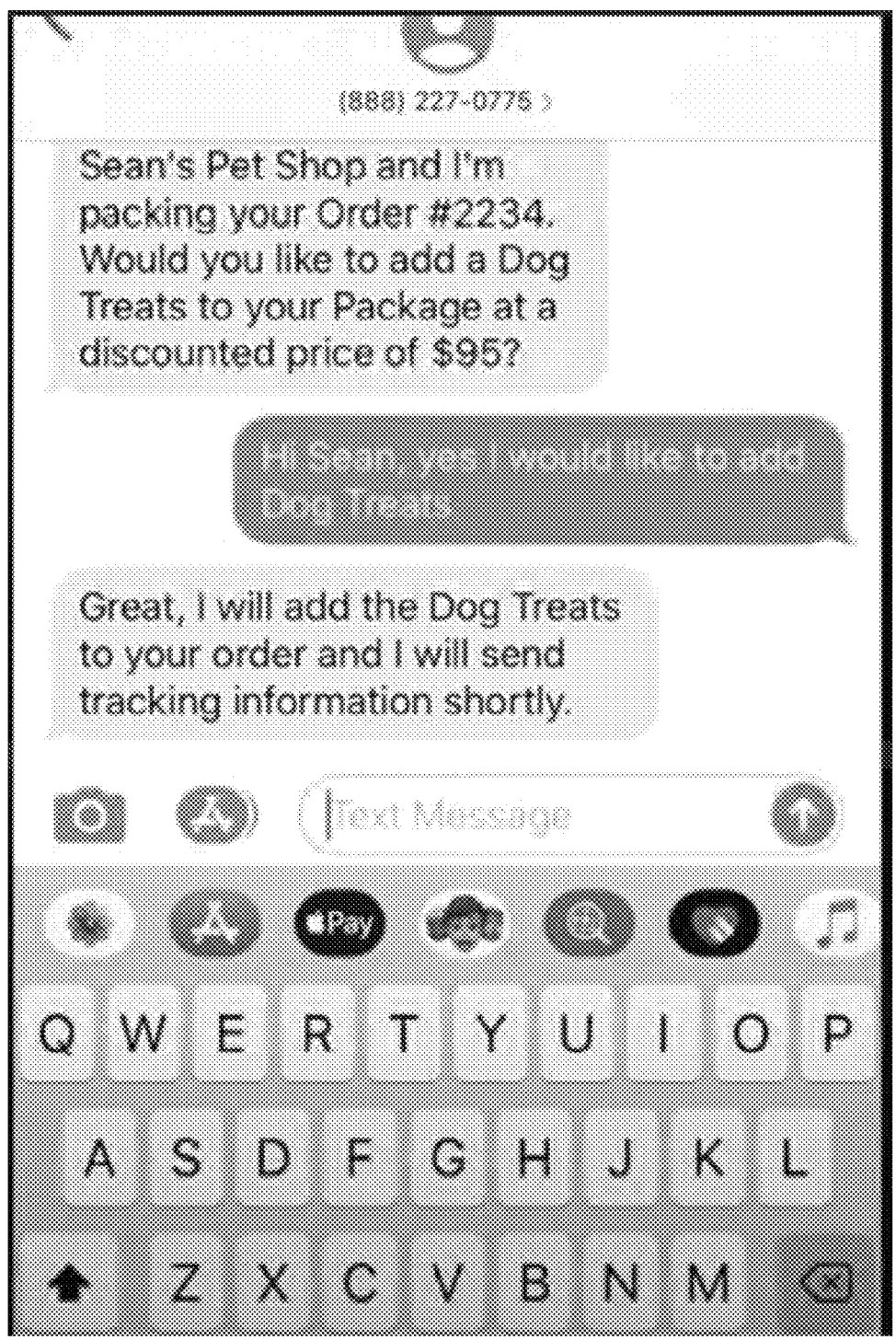
Figure 21:
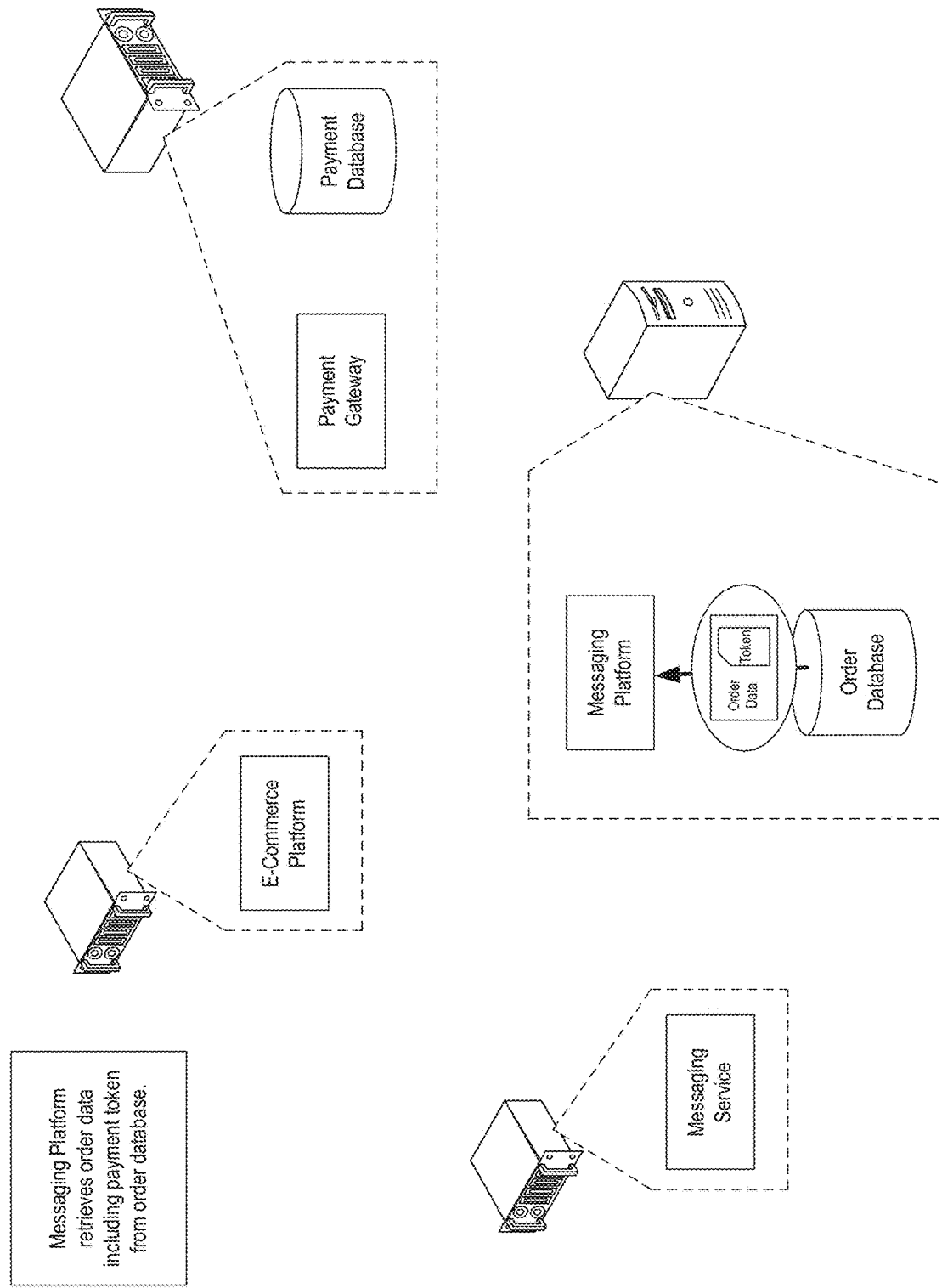
Figure 22:
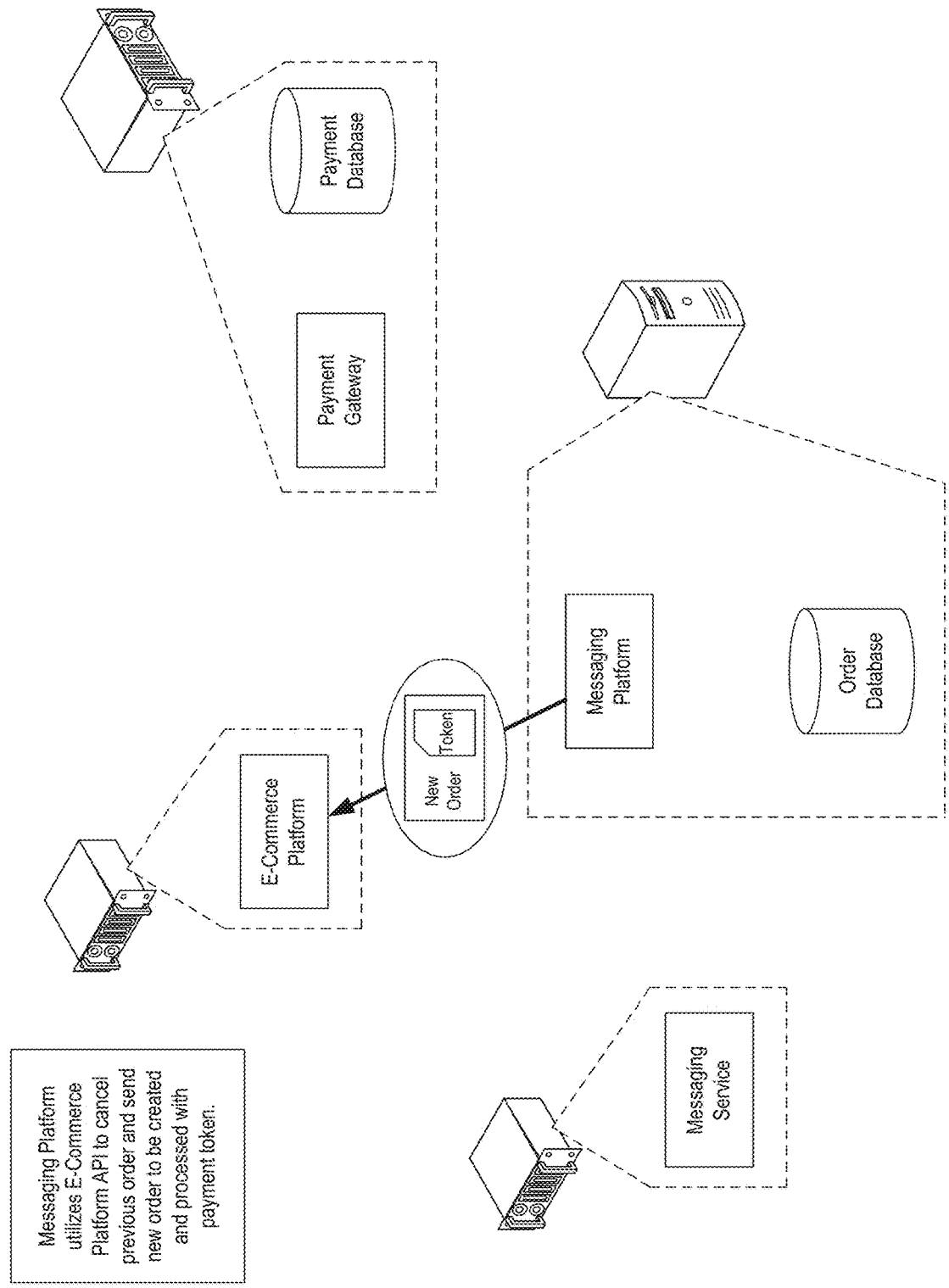

If the response is determined to be an acceptance, then the Messaging Platform utilizes the API of the Messaging Service to text back a confirmation of the upsell acceptance, as illustrated in FIG. 20. The Messaging Platform retrieves order data for the order from the order database (including the payment token), as illustrated in FIG. 21, generates a new order including the previously ordered items plus the one or more upsell items that have been accepted, adds the stored payment token for the prior order to the newly generated order, and utilizes the API of the E-Commerce Platform to cancel the previous order and posts the newly generated order including the payment token to be created and processed at the E-Commerce Platform utilizing the payment token, as illustrated in FIG. 22.

FIG. 27 illustrates exemplary code for an accept upsell event handler which attempts to run a completeUpsell function for an order. FIG. 28 illustrates exemplary code for an upsell rejection event handler which attempts to run a rejectUpsell function. FIG. 29 illustrates exemplary code for processing payment for an additional item using tokenized payment from a previous item or order.

If payment has already been captured, then the Messaging Platform utilizes the API of the E-Commerce Platform to cancel and refund the prior order. If, on the other hand, payment has not yet been captured, then the Messaging Platform will merely need to utilize the API of the E-Commerce Platform to cancel the previous order and will not need to refund the prior order. Payment for the new order will thereafter be captured using the payment token. It will be appreciated that storage of the payment token by the Messaging Platform and communication of the payment token as part of a new order will allow for the new, modified order to be created and payment captured even though the E-Commerce Platform likely will no longer have had the payment token stored.

In accordance with one or more preferred implementations, communications between an Messaging Platform and E-Commerce Platform are implemented utilizing PHP.

In accordance with one or more preferred implementations, a Messaging Platform also integrates directly with one or more shipping platforms or order management platforms (e.g. ShippingEasy) and is configured to "hold" the shipping of an item based on a user-configured time window, to allow time for a customer user to receive and consider an upsell offer. In accordance with one or more preferred implementations, the Messaging Platform is able to send an indication to add and ship any additional upsell items that were accepted. In accordance with one or more preferred implementations, a Messaging Platform utilizes this integration to subscribe to/receive/retrieve/access packaging tracking information and provides this information to a customer user via a text message.

In accordance with one or more preferred implementations, a Messaging Platform is configured to integrate with a Messaging Service that provides SMS, MMS, and RCS texting functionality, or directly provides this functionality itself.

In accordance with one or more preferred implementations, a Messaging Platform utilizes an order database or customer database which is used to store demographic and personal information for customers, and this information is utilized to statically or dynamically group users into segments which can be utilized to drive mass text messages or actions during methods described herein. For example, the product or products offered as part of an upsell offer may vary based on a segment of a customer user. In accordance with one or more preferred implementations, a MySQL backend and a flexible schema is utilized to allow users to define and upload/provide their own data beyond a core set of predefined fields.

In accordance with one or more preferred implementations, a Messaging Platform is configured to allow a user to send broadcast, bulk, or mass text messages based on data in an order database or customer database, which can be an offer to purchase one or more items or services that can be automatically fulfilled if a recipient responds with an acceptance.

In accordance with one or more preferred implementations, a Messaging Platform is configured utilizing a Messaging Service to forward calls received at a number from which texts are sent to any number desired by a retailer. For example, a Messaging Platform might be configured to trigger a package delayed automated message to a customer when the customer's package is delayed, and forward any calls received in response to a specified number. An automated message might also be triggered if a text received from a customer cannot be understood by a language engine; the automated message might ask the customer to call the texting number.

In accordance with one or more preferred implementations, an IP address or shipping address of a customer is utilized to estimate a location for a customer, and tailor automated messages to be sent at a time that is appropriate for that time zone.

In accordance with one or more preferred implementations, a Messaging Platform is configured to allow a retailer user to override an automated message and begin a manual text message conversation.

In accordance with one or more preferred implementations, a configuration tool of a Messaging Platform allows a retailer user to include dynamic content in configured automated messages by use of a dynamic content zone, which may for example be replaced by a photo of male clothing for a male, or female clothing for a female, based on data for a customer.

In accordance with one or more preferred implementations, a Messaging Platform offers a cart abandonment response feature where an automated text message sent in response to a cart abandonment allows a user to complete the purchase via a text reply.

In accordance with one or more preferred implementations, Messaging Platform functionality is implemented by adding a button or element to a customer's websites, or even a popup, that reads "Purchase via Text." If a customer clicks, they opt in, then start texting directly with an Messaging Platform as described herein. Preferably, a language engine and AI engine are utilized to automatically engage with the customer to send images, videos, and other product descriptions including price. If the consumer clicks, and texts they want to buy, the transaction is completed as described herein. Payment can be saved from a previous purchase (e.g. a saved payment token), or if not saved payment details are provided via the phone, or a link is sent to an interface for the customer to enter payment info (which is tokenized for the future).

Based on the foregoing information, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being limited only by the claims appended hereto and the equivalents thereof.

What is claimed is:

1. A method comprising:
   (I) first,
      (a) displaying, to a first user, a dashboard interface of a configuration tool of a messaging platform,
      (b) receiving, at the messaging platform, user input corresponding to settings input for the first user utilizing the dashboard interface of the configuration tool, the settings input including an indication of an upsell product, an indication of an upsell price for the upsell product, and an indication of an upsell delay; and
   (II) thereafter,
      (a) receiving, at an e-commerce platform, user input of a second user corresponding to purchasing one or more products or services, including user input corresponding to payment information,
      (b) communicating, from the e-commerce platform to a payment gateway, an indication of the input payment information,
      (c) authorizing, by the payment gateway, the received payment information, and returning to the e-commerce platform an indication of the authorization and a payment token,
      (d) in response to receiving the returned indication of authorization and payment token, completing, by the e-commerce platform, the purchase as a first order,
      (e) upon or as part of completion of the order, prompting the second user, via an interface, to opt in to receiving shipping notifications and automated promotional offers via text message, such prompting including prompting the second user for a phone number,
      (f) receiving, at the e-commerce platform, user input of the second user corresponding to opting in to receive shipping notifications and automated promotional offers via text message,
      (g) determining, at the e-commerce platform, that the second user has opted in to receive shipping notifications and automated promotional offers via text message, and based thereon, sending an order notification to the messaging platform including an indication of the completed first order and the associated payment token,
      (h) storing, by the messaging platform, the received order information for the completed first order including the payment token in an order database, (i) utilizing, by the messaging platform, an API of a messaging service to send a text message confirming the completed first order to the phone number provided by the second user;

(III) thereafter,
(a) determining, by the messaging platform, that the upsell delay time specified by the first user has elapsed,
(b) based on determining that the upsell delay time specified by the first user has elapsed, utilizing, by the messaging platform, an API of the messaging service to send an automated text message to the phone number provided by the second user querying whether the second user would like to purchase the upsell item specified by the first user for the upsell price specified by the first user,
(c) receiving, at the messaging platform via the messaging service, the text of a response to the automated text message,
(d) determining, by the messaging platform based on analyzing the text of the response to the automated message, that the second user accepted the offer to purchase the upsell item specified by the first user for the upsell price specified by the first user,
(e) based on determining that the second user accepted the offer to purchase the upsell item specified by the first user for the upsell price specified by the first user,
(i) utilizing, by the messaging platform, the API of the messaging service to text back a confirmation of the upsell offer acceptance,
(ii) retrieving, by the messaging platform, order data for the first order, including stored data for the payment token associated with the first order,
(iii) generating, by the messaging platform, a new order including the previously ordered items plus the upsell item specified by the first user,
(iv) adding, by the messaging platform, the stored payment token for the first order to the newly generated order,
(v) utilizing, by the messaging platform, the API of the e-commerce platform to cancel the previous order and post the newly generated order including the payment token to be created and processed at the e-commerce platform utilizing the payment token.

2. The method of claim 1, wherein the dashboard interface is a dashboard interface of a web page.

3. The method of claim 1, wherein the dashboard interface is a dashboard interface of a mobile app.

4. The method of claim 1, wherein the e-commerce platform comprises a mobile app.

5. The method of claim 1, wherein the e-commerce platform comprises a web page.

* * * * *